(12) United States Patent
Akahori et al.

(10) Patent No.: US 11,982,750 B2
(45) Date of Patent: May 14, 2024

(54) DISTANCE-IMAGE CAPTURING APPARATUS AND DISTANCE-IMAGE CAPTURING METHOD

(71) Applicants: BROOKMAN TECHNOLOGY, INC., Shizuoka (JP); TOPPAN INC., Tokyo (JP)

(72) Inventors: Tomoyuki Akahori, Hamamatsu (JP); Yu Ookubo, Tokyo (JP); Kunihiro Hatakeyama, Tokyo (JP); Satoshi Takahashi, Tokyo (JP)

(73) Assignees: TOPPAN INC., Tokyo (JP); BROOKMAN TECHNOLOGY, INC., Hamamatsu (JP)

( * ) Notice: Subject to any disclaimer, the term of this patent is extended or adjusted under 35 U.S.C. 154(b) by 186 days.

(21) Appl. No.: 17/586,447

(22) Filed: Jan. 27, 2022

(65) Prior Publication Data
US 2022/0146684 A1     May 12, 2022

Related U.S. Application Data

(63) Continuation of application No. PCT/JP2020/029199, filed on Jul. 30, 2020.

(30) Foreign Application Priority Data

Aug. 1, 2019   (JP) ................. 2019-142536

(51) Int. Cl.
*G01S 17/894*     (2020.01)
*G01S 17/10*     (2020.01)
(Continued)

(52) U.S. Cl.
CPC ............ *G01S 17/894* (2020.01); *G01S 17/10* (2013.01); *H04N 23/56* (2023.01); *H04N 23/72* (2023.01)

(58) Field of Classification Search
CPC ....... G01S 17/894; G01S 17/10; H04N 23/56; H04N 23/72
See application file for complete search history.

(56) References Cited

U.S. PATENT DOCUMENTS 5,705,807 A * 1/1998 Throngnumchai ..... H03F 3/087
356/221
2011/0194099 A1   8/2011 Kamiyama
(Continued)

FOREIGN PATENT DOCUMENTS

JP   2010-96730 A   4/2010
JP   2018-009917   1/2018
(Continued)

OTHER PUBLICATIONS

European Search Report issued in European Application No. 20847013.8 dated Jun. 12, 2023.
(Continued)

*Primary Examiner* — Mishawn N. Hunter
(74) *Attorney, Agent, or Firm* — STAAS & HALSEY LLP

(57) ABSTRACT

A light source unit that emits a light pulse, a light receiving unit that includes pixels each including a photoelectric conversion device generating electric charge according to incident light and a plurality of electric charge accumulating units accumulating the electric charge and a pixel driving circuit that distributes the electric charge to the electric charge accumulating units of the pixels to be accumulated therein at a predetermined accumulation timing synchronized with the emission of the light pulse, and a distance image processing unit that measures the distance to a subject present in the measurement space on the basis of amounts of electric charge accumulated in the electric charge accumulating units are included, and the distance image processing unit includes a timing control unit that controls the accu-
(Continued)

mulation timing in accordance with a measurement mode set in advance in accordance with a range of distances that are measurement targets.

8 Claims, 17 Drawing Sheets

(51) Int. Cl.
*H04N 23/56* (2023.01)
*H04N 23/72* (2023.01)

(56) References Cited

U.S. PATENT DOCUMENTS

| | | |
|---|---|---|
| 2012/0062778 A1 | 3/2012 | Aoyama |
| 2016/0161611 A1* | 6/2016 | Ito .................. G01S 17/894 356/51 |
| 2016/0248953 A1* | 8/2016 | Fujita ................ H04N 23/56 |
| 2016/0320486 A1 | 11/2016 | Murai et al. |
| 2017/0242126 A1 | 8/2017 | Matsuo et al. |
| 2017/0243367 A1* | 8/2017 | Lee .................. H04N 25/704 |
| 2018/0189591 A1* | 7/2018 | Ohki ................ G06V 10/242 |
| 2020/0309921 A1* | 10/2020 | Yasu ................ G01S 7/4865 |
| 2021/0333372 A1* | 10/2021 | Akahori ............. G01S 17/894 |
| 2021/0333398 A1* | 10/2021 | Yasu ................ G01S 17/46 |
| 2021/0368123 A1* | 11/2021 | Watanabe .......... G01S 7/4873 |

FOREIGN PATENT DOCUMENTS

| | | |
|---|---|---|
| JP | 6298236 B2 | 3/2018 |
| JP | 2018-185179 | 11/2018 |
| WO | WO 2015/107869 A1 | 7/2015 |
| WO | WO 2016/075885 A1 | 5/2016 |
| WO | WO 2019/078366 A1 | 4/2019 |

OTHER PUBLICATIONS

Japanese Office Action issued in Japanese Application No. 2019-142536 dated Jun. 20, 2023.
International Search Report (Form PCT/ISA/210); dated Sep. 29, 2020 in corresponding PCT Application No. PCT/JP2020/029199; (3 pages) (3 pages English Translation).

\* cited by examiner

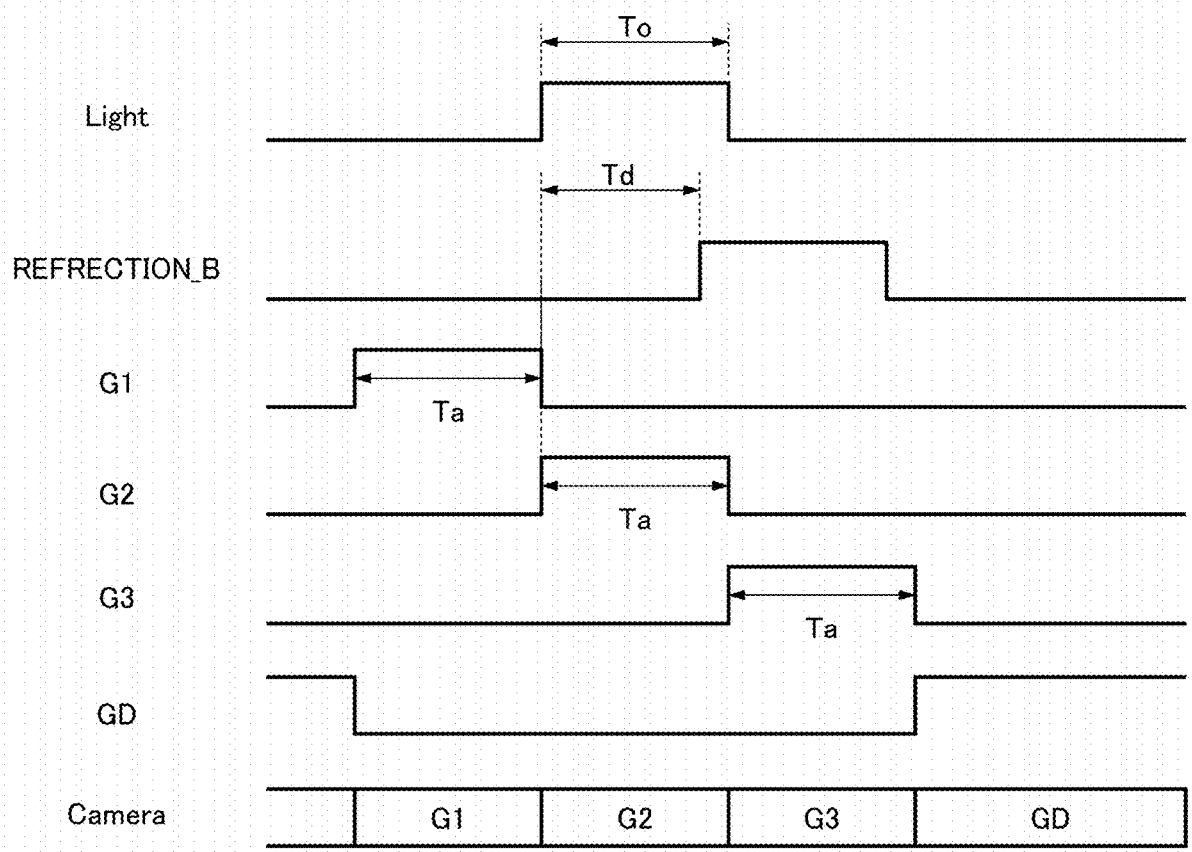

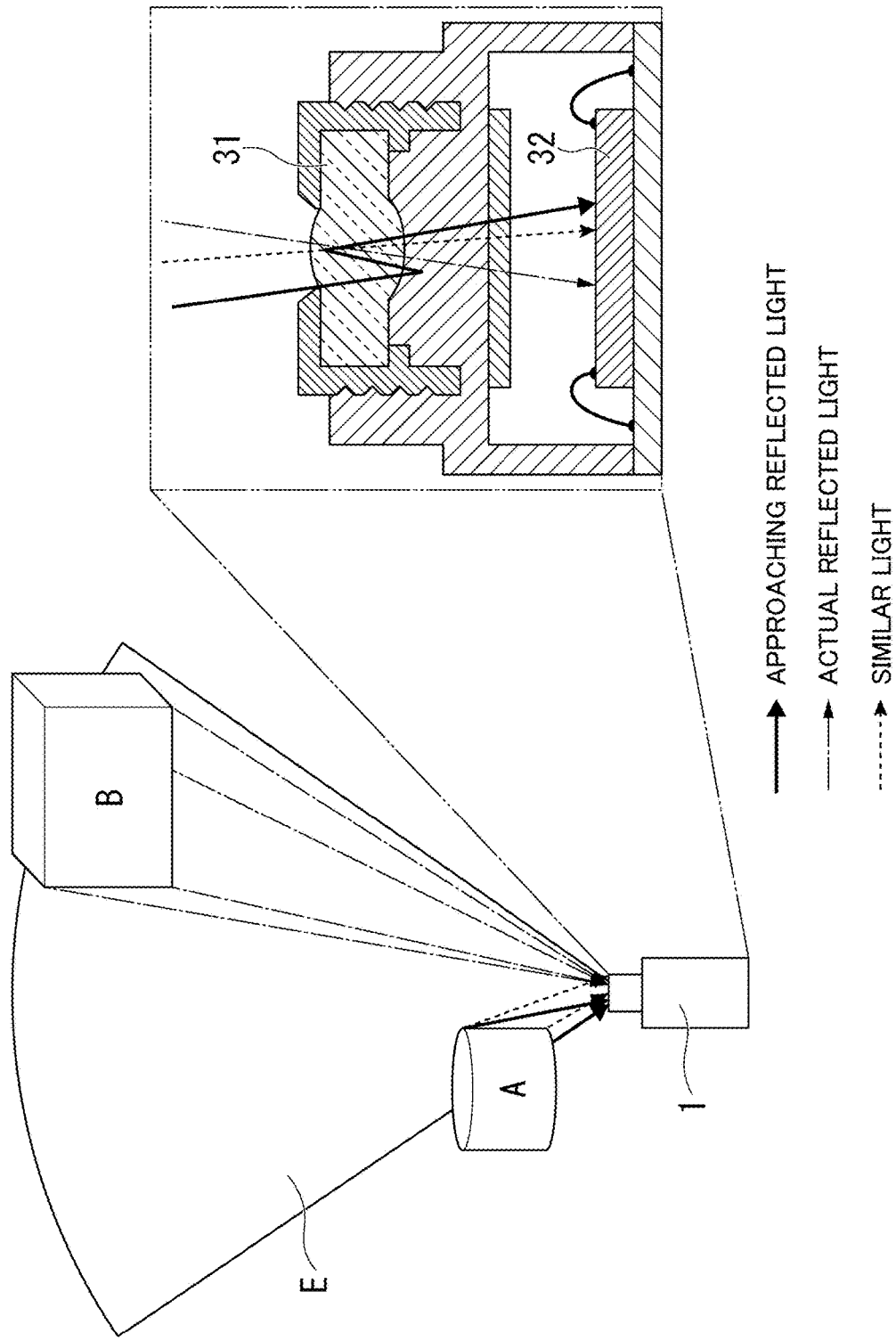

DISTANCE-IMAGE CAPTURING APPARATUS AND DISTANCE-IMAGE CAPTURING METHOD

CROSS REFERENCE TO RELATED APPLICATIONS

This application is a continuation application based on PCT International Patent Application No. PCT/JP2020/029199, filed on Jul. 30, 2020, which claims priority to Japanese Patent Application No. 2019-142536, filed on Aug. 1, 2019, in the Japan Patent Office. The contents of both the Japanese Patent Application and the PCT Application are incorporated herein by reference.

FIELD OF THE INVENTION

The present invention relates to a distance-image capturing apparatus and a distance-image capturing method.

DESCRIPTION OF RELATED ART

Conventionally, distance-image capturing apparatuses of a time of flight (hereinafter, referred to as "TOF") system measuring the distance to a subject on the basis of a flying time of light using a fact that the speed of light is known are known. In a distance-image capturing apparatus, similar to an image capturing apparatus, a plurality of pixels detecting light for measuring a distance are disposed in a two-dimensional matrix pattern, and information of a two-dimensional distance to a subject and an image of the subject can be obtained (captured).

In a case in which the distance to an object present at a long distance is to be measured with high accuracy using such a distance-image capturing apparatus, there is a method of increasing the number of times of distribution (the amount of exposure). However, there are cases in which, in addition to an object present at a long distance, another object is present also at a short distance. In such a situation, when light is simultaneously emitted to both the object present at a long distance and the object present at a short distance, reflected light from the object present at the short distance is received with an intensity higher than that of reflected light from the object present at the long distance. When reflected light with such a high intensity is received, multiple reflections, a so-called a flare phenomenon, occurs in an optical system such as a lens inside a distance-image capturing apparatus. This flare phenomenon has an influence on the amount of received light of pixels detecting light for measuring the distance to an object that is present at a long distance and becomes a factor causing error in the measured distance.

As a countermeasure for reducing error in a measured distance by inhibiting occurrence of multiple reflection, by having a measurement environment incorporating certain optical designs and optical materials in a distance-image capturing apparatus, the flare phenomenon can be reduced or avoided. However, on the other hand, processing that is specific to a lens is necessary, and there is a problem that the costs may rise, or the measurement environment may be restricted.

As another countermeasure different from the countermeasure described above, performing a process of eliminating a light reception component according to the flare phenomenon from the amount of received light of pixels is conceivable. In Patent Japanese Patent No. 6298236, a technology for eliminating a light reception component according to a flare phenomenon using a database of a reference electric charge amount ratio is disclosed. The reference electric charge amount ratio is the ratio of the amount of electric charge for each distance that is obtained by measuring a target object in an ideal environment of a case in which flare does not occur.

However, in the technology of Patent Japanese Patent No. 6298236, the database of the reference electric charge amount ratio needs to be generated. In order to eliminate a light reception component according to a flare phenomenon with high accuracy, after an ideal environment in which flare does not occur is built, a detailed database obtained through sampling with finely separated distances needs to be generated. For this reason, there is a problem in that a certain time is required to generate the database.

The present invention is based on the problem described above, and an object thereof is to provide a distance-image capturing apparatus and a distance-image capturing method capable of inhibiting an influence according to a flare phenomenon without changing an optical configuration of the inside of the apparatus and without generating a database indicating a relation between a distance and a ratio of amounts of electric charge in an ideal environment.

SUMMARY OF THE INVENTION

According to the present invention, there is provided a distance-image capturing apparatus including: a light source unit that emits a light pulse to a measurement space that is a space in which measurement is performed; a light receiving unit that includes pixels each including a photoelectric conversion device generating electric charge according to incident light and a plurality of electric charge accumulating units accumulating the electric charge and a pixel driving circuit that distributes the electric charge to the electric charge accumulating units of the pixels to be accumulated in the electric charge accumulating units at a predetermined accumulation timing synchronized with the emission of the light pulse; and a distance image processing unit that measures the distance to a subject present in the measurement space on the basis of amounts of electric charge accumulated in the electric charge accumulating units, the distance image processing unit including a timing control unit that controls the accumulation timing in accordance with a measurement mode set in advance in accordance with the range of distances that are measurement targets.

In the distance-image capturing apparatus according to the present invention, the plurality of electric charge accumulating units of the pixel may be formed from a first electric charge accumulating unit, a second electric charge accumulating unit, and a third electric charge accumulating unit, and in a case in which the measurement mode is a long-distance mode, the timing control unit may accumulate the electric charge in the first electric charge accumulating unit in an external light accumulation period that is an off state in which the light pulse is not emitted, set at least a flare light reception period as a non-accumulation period in which the electric charge is not accumulated in any one of the electric charge accumulating units, and, after elapse of the non-accumulation period, distribute electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit, the flare light reception period being a period that is delayed by a predetermined pulse light delay time from an emission period that is a period in which the light pulse is emitted, the reflected light reception period being a period delayed by a reflected light delay time longer than the pulse light delay time from the emission period, and the flare light reception period and the reflected light reception period being periods not overlapping each other.

In the distance-image capturing apparatus according to the present invention, the plurality of electric charge accumulating units of the pixel may be formed from a first electric charge accumulating unit, a second electric charge accumulating unit, and a third electric charge accumulating unit, and in a case in which the measurement mode is an intermediate distance mode, the timing control unit may distribute electric charge corresponding to an amount of light incident to the light receiving unit in a flare light reception period to the first electric charge accumulating unit and the second electric charge accumulating unit to be accumulated in the first electric charge accumulating unit and the second electric charge accumulating unit and distribute electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit, the flare light reception period being a period that is delayed by a predetermined pulse light delay time from an emission period that is a period in which the light pulse is emitted, the reflected light reception period being a period delayed by a reflected light delay time longer than the pulse light delay time from the emission period, the flare light reception period and the reflected light reception period being periods at least partially overlapping each other, and the distance image processing unit may extract a flare light component according to flare light from the amounts of electric charge on the basis of the amounts of electric charge accumulated in the electric charge accumulating units in the intermediate distance mode and measure the distance to the subject on the basis of values acquired by excluding the extracted flare light component from the amounts of electric charge.

In the distance-image capturing apparatus according to the present invention, the timing control unit performs measurement in the intermediate distance mode and an intermediate distance external light mode as the measurement modes and, in a case in which the measurement mode is the intermediate distance external light mode, accumulates the electric charge in the first electric charge accumulating unit in an external light accumulation period that is an off state in which the light pulse is not emitted, and the distance image processing unit extracts a flare light component according to flare light on the basis of the amounts of electric charge accumulated in the electric charge accumulating units in the intermediate distance mode, extracts an external light component according to external light on the basis of the amounts of electric charge accumulated in the electric charge accumulating units in the intermediate distance external light mode, and measures the distance to the subject using the extracted flare light component and the external light component.

In the distance-image capturing apparatus according to the present invention, in a case in which the measurement mode is the intermediate distance external light mode, the timing control unit accumulates the electric charge in the first electric charge accumulating unit in the external light accumulation period in which the light pulse is the off state, sets the flare light reception period as a non-accumulation period in which the electric charge is not accumulated in any one of the electric charge accumulating unit, and distributes an electric charge corresponding to the amount of light incident to the light receiving unit in a reflected light reception period to the second electric charge accumulating unit and the third electric charge accumulating unit to be accumulated in the second electric charge accumulating unit and the third electric charge accumulating unit, and the distance image processing unit measures the distance to the subject present in the measurement space by combining the amounts of electric charge accumulated in the electric charge accumulating units in the intermediate distance mode and the amounts of electric charge accumulated in the electric charge accumulating units in the intermediate distance external light mode.

In the distance-image capturing apparatus according to the present invention, the distance image processing unit extracts values acquired by multiplying the amount of electric charge accumulated in the first electric charge accumulating unit by a constant in the intermediate distance mode as a flare light component according to flare light included in the amount of electric charge accumulated in the second electric charge accumulating unit.

In the distance-image capturing apparatus according to the present invention, the plurality of electric charge accumulating units of the pixel are formed from a first electric charge accumulating unit, a second electric charge accumulating unit, a third electric charge accumulating unit, and a fourth electric charge accumulating unit, the timing control unit accumulates the electric charge in the first electric charge accumulating unit in an external light accumulation period that is an off state in which the light pulse is not emitted, distributes an electric charge corresponding to an amount of light incident to the light receiving unit to the second electric charge accumulating unit and the third electric charge accumulating unit to be accumulated in the second electric charge accumulating unit and the third electric charge accumulating unit in a flare light reception period, and distributes an electric charge corresponding to an amount of light incident to the light receiving unit in a reflected light reception period to the third electric charge accumulating unit and the fourth electric charge accumulating unit to be accumulated in the third electric charge accumulating unit and the fourth electric charge accumulating unit, the flare light reception period is a period that is delayed by a predetermined pulse light delay time from an emission period that is a period in which the light pulse is emitted, and the reflected light reception period is a period delayed by a reflected light delay time longer than the pulse light delay time from the emission period.

The distance-image capturing apparatus according to the present invention, further including a measurement control unit that controls measurement, in which the measurement control unit causes the distance to the subject to be measured with the measurement mode set as a first normal mode, determines whether or not a short distance object present at a shorter distance than the subject is present in the measurement space on the basis of the amounts of electric charge accumulated in the electric charge accumulating units in the first normal mode, and, in a case in which the short distance object is present in the measurement space, changes the measurement mode and performs re-measurement, and the plurality of electric charge accumulating units of the pixel are formed from a first electric charge accumulating unit, a second electric charge accumulating unit, and a third electric charge accumulating unit, and in a case in which the measurement mode is the first normal mode, the timing control unit accumulates the electric charge in the first electric charge accumulating unit in an external light accumulation period that is an off state in which the light pulse is not emitted and repeats an accumulation period in which the electric charge is sequentially accumulated in the second electric charge accumulating unit and the third electric charge accumulating unit for a predetermined number of accumulation times in a predetermined reflected light reception period after an on state in which the light pulse is emitted is formed.

In the distance-image capturing apparatus according to the present invention, in a case in which the amount of electric charge accumulated in the second electric charge accumulating unit is equal to or larger than a predetermined threshold in the first normal mode, the measurement control unit determines that the short distance object is present in the measurement space.

According to the present invention, there is provided a distance-image capturing method using a distance-image capturing apparatus including: a light source unit that emits a light pulse to a measurement space that is a space in which measurement is performed; a light receiving unit that includes pixels each including a photoelectric conversion device generating electric charge according to incident light and a plurality of electric charge accumulating units accumulating the electric charge and a pixel driving circuit that distributes the electric charge to the electric charge accumulating units of the pixels to be accumulated in the electric charge accumulating units at a predetermined accumulation timing synchronized with the emission of the light pulse; a distance image processing unit that measures the distance to a subject present in the measurement space on the basis of amounts of electric charge accumulated in the electric charge accumulating units; and a timing control unit that controls the accumulation timing, the distance-image capturing method including a step of controlling the accumulation timing in accordance with a measurement mode set in advance in accordance with the range of distances that are measurement targets using the timing control unit.

According to the present invention, an effect according to a flare phenomenon can be inhibited without changing an optical configuration of the inside of an apparatus and without using a database.

BRIEF DESCRIPTION OF THE DRAWINGS

FIG. 12A is a timing diagram showing timings at which pixels are driven in conventional measurement.

FIG. 12B is a diagram showing a concept of flare light according to an embodiment.

DETAILED DESCRIPTION OF THE INVENTION

Hereinafter, distance-image capturing apparatuses according to embodiments will be described with reference to the drawings.

First Embodiment

Figure 1:
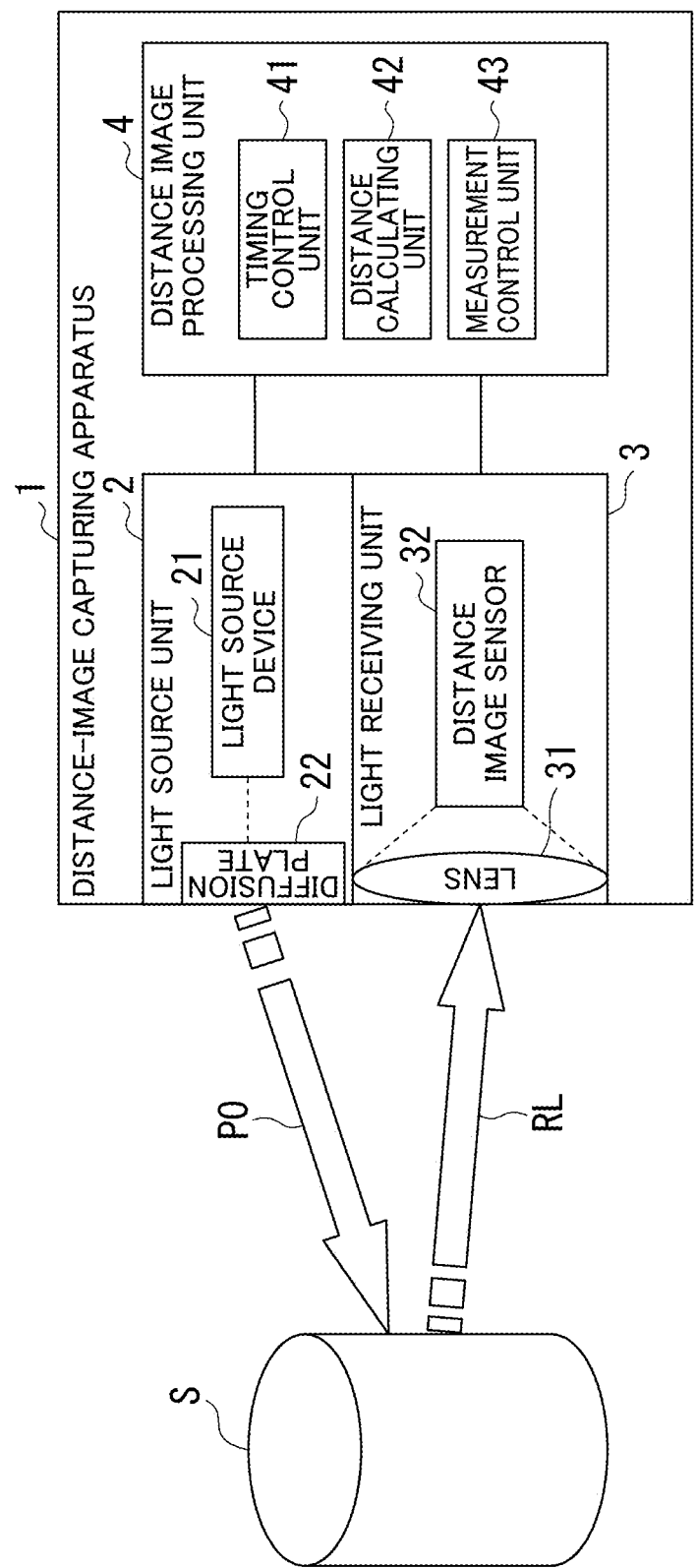
FIG. 1 is a block diagram showing a schematic configuration of a distance-image capturing apparatus according to a first embodiment.

Hereinafter, a first embodiment will be described. FIG. 1 is a block diagram showing a schematic configuration of a distance-image capturing apparatus according to the first embodiment of the present invention. The distance-image capturing apparatus 1 having the configuration illustrated in FIG. 1 includes a light source unit 2, a light receiving unit 3, and a distance image processing unit 4. A subject S that is a target object for which a distance is measured by the distance-image capturing apparatus 1 is shown in FIG. 1 as well.

The light source unit 2 emits a light pulse PO to an imaging target space in which the subject S that is a target, for which a distance is measured by the distance-image capturing apparatus 1 is present, in accordance with control from the distance image processing unit 4. The light source unit 2, for example, is a semiconductor laser module of a surface emission type such as a vertical cavity surface emitting laser (VCSEL). The light source unit 2 includes a light source device 21 and a diffusion plate 22

The light source device 21 is a light source that emits laser light having a near infrared wavelength band (for example, the wavelength is in a wavelength band of 850 nm to 940 nm) that becomes a light pulse PO emitted to a subject S.

The light source device 21, for example, is a semiconductor laser light emitting device. The light source device 21 emits laser light having a pulse shape in accordance with control from a timing control unit 41.

The diffusion plate 22 is an optical component that diffuses laser light of a near infrared wavelength band emitted by the light source device 21 into an area of a surface of the subject S to which the laser light is emitted. Pulse-shaped laser light diffused by the diffusion plate 22 exits as a light pulse PO and is emitted to a subject S.

The light receiving unit 3 receives reflected light RL of a light pulse PO reflected by a subject S that is a target for which a distance is measured by the distance-image capturing apparatus 1 and outputs a pixel signal according to the received reflected light RL. The light receiving unit 3 includes a lens 31 and a distance image sensor 32.

The lens 31 is an optical lens that leads reflected light RL that has been incident to the distance image sensor 32. The lens 31 causes the incident reflected light RL to exit to the distance image sensor 32 side and be received by (incident to) pixels provided in a light reception area of the distance image sensor 32.

The distance image sensor 32 is an imaging device used in the distance-image capturing apparatus 1. The distance image sensor 32 includes a plurality of pixels in a two-dimensional light reception area. One photoelectric conversion device, a plurality of electric charge accumulating units corresponding to one photoelectric conversion device, and a constituent element distributing electric charge to the electric charge accumulating units are disposed in each of the pixels of the distance image sensor 32. In other words, the pixels are imaging devices having a configuration for distributing and accumulating electric charge in a plurality of electric charge accumulating units.

The distance image sensor 32 distributes an electric charge generated by photoelectric conversion devices to the electric charge accumulating units in accordance with control from the timing control unit 41. In addition, the distance image sensor 32 outputs a pixel signal corresponding to the amount of electric charge distributed to each electric charge accumulating unit. A plurality of pixels are disposed in a two-dimensional matrix pattern in the distance image sensor 32, and pixel signals corresponding to one frame corresponding to each pixel are output.

The distance image processing unit 4 calculates the distance to a subject S by controlling the distance-image capturing apparatus 1. The distance image processing unit 4 includes a timing control unit 41, a distance calculating unit 42, and a measurement control unit 43.

The timing control unit 41 controls timings at which various control signals required for measurement are output in accordance with control of the measurement control unit 43. The various control signals described here, for example, are a signal for controlling emission of a light pulse PO, a signal for distributing reflected light RL into a plurality of electric charge accumulating units, a signal for controlling the number of times of distribution per frame, and the like. The number of times of distribution is the number of times of repetition of the process of distributing electric charge to the electric charge accumulating units CS (see FIG. 3).

The distance calculating unit 42 outputs distance information calculated as the distance to a subject S on the basis of pixel signals output from the distance image sensor 32. The distance calculating unit 42 calculates a delay time Td (see FIG. 12A) that is a time from emission of a light pulse PO to receiving of a reflected light RL on the basis of the amounts of electric charge accumulated in the plurality of electric charge accumulating units. The distance calculating unit 42 calculates the distance to a subject S in accordance with the calculated delay time Td.

The measurement control unit 43 selects one measurement mode from among a plurality of measurement modes in accordance with a measurement environment. A measurement mode is provided for each environment in which measurement is performed, and a timing at which a light pulse PO is emitted and a timing at which reflected light RL is distributed to the plurality of electric charge accumulating units are defined using different relations. The environments in which measurement are performed are classified in accordance with the range of distances to be measured, and whether or not flare light, that is a cause of deterioration in accuracy of measurement, has been taken into consideration or not, and the like. Details of measurement modes will be described in detail later.

In accordance with such a configuration, in the distance-image capturing apparatus 1, reflected light RL acquired by a light pulse PO of a near infrared wavelength band emitted to a subject S by the light source unit 2 being reflected by the subject S is received by the light receiving unit 3, and the distance image processing unit 4 outputs distance information acquired by measuring the distance to the subject S.

Although the distance-image capturing apparatus 1 having a configuration in which the distance image processing unit 4 is provided inside thereof is shown in FIG. 1, the distance image processing unit 4 may be a constituent element that is provided outside the distance-image capturing apparatus 1.

Figure 2:
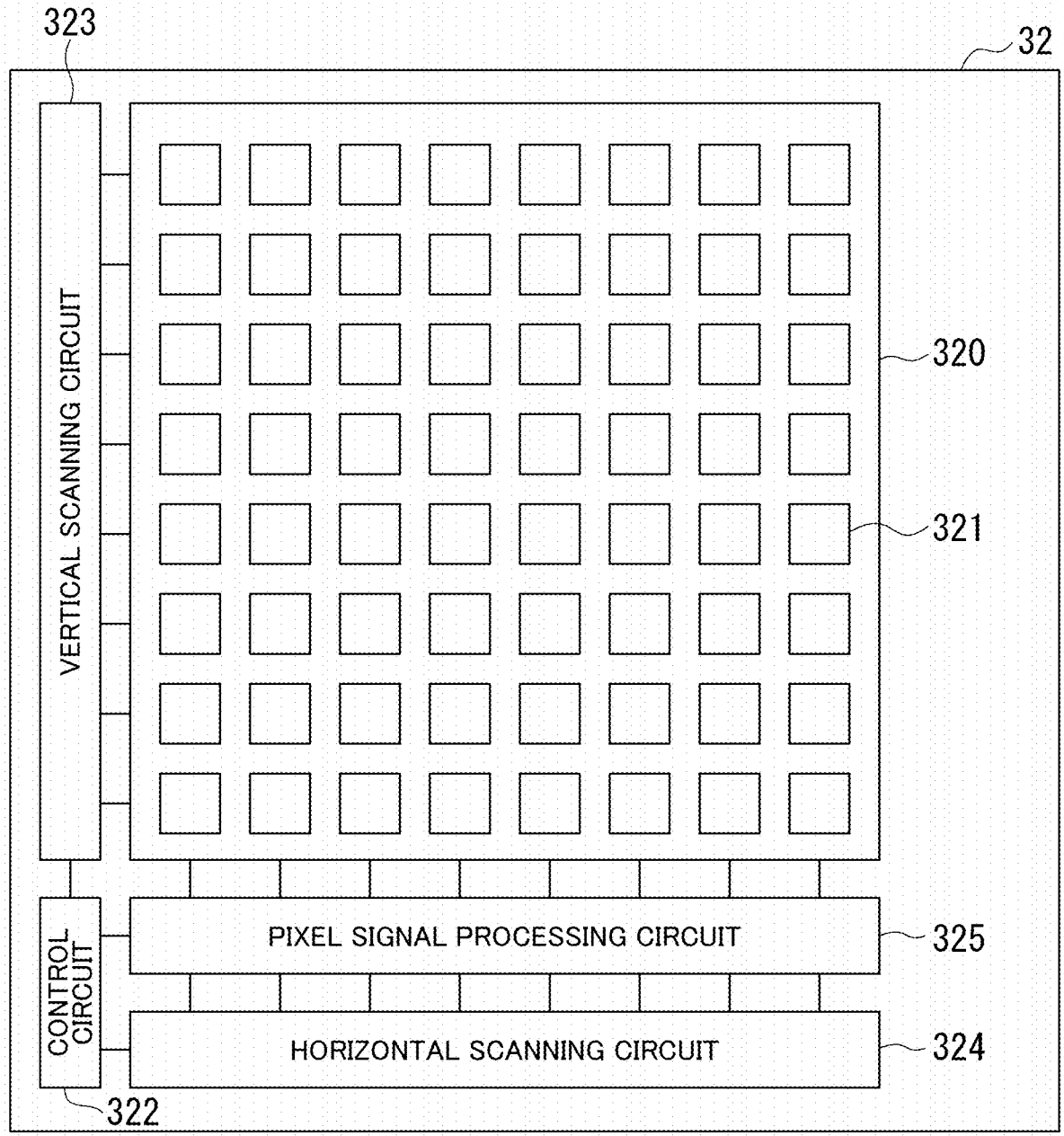
FIG. 2 is a block diagram showing a schematic configuration of an imaging device used in the distance-image capturing apparatus according to the first embodiment.

Next, the configuration of the distance image sensor 32 used as an imaging device in the distance-image capturing apparatus 1 will be described. FIG. 2 is a block diagram showing a schematic configuration of an imaging device (the distance image sensor 32) used in the distance-image capturing apparatus 1 according to the first embodiment of the present invention.

As shown in FIG. 2, for example, the distance image sensor 32 includes a light reception area 320 in which a plurality of pixels 321 are disposed, a control circuit 322, a vertical scanning circuit 323 having a distribution operation, a horizontal scanning circuit 324, and a pixel signal processing circuit 325.

The light reception area 320 is an area in which a plurality of pixels 321 are disposed, and FIG. 2 illustrates an example in which the pixels are disposed in a two-dimensional matrix pattern of eight rows and eight columns. The pixels 321 accumulate electric charge corresponding to the amount of received light. The control circuit 322 performs overall control of the distance image sensor 32. For example, the control circuit 322 controls operations of constituent elements of the distance image sensor 32 in accordance with an instruction from the timing control unit 41 of the distance image processing unit 4. The control of the constituent elements included in the distance image sensor 32 may be configured to be directly performed by the timing control unit 41. In such a case, the control circuit 322 may be omitted.

The vertical scanning circuit 323 is a circuit that controls the pixels 321 disposed in the light reception area 320 for each row in accordance with control from the control circuit 322. The vertical scanning circuit 323 outputs a voltage signal according to an amount of electric charge accumulated in each of the electric charge accumulating units CS of the pixel 321 to the pixel signal processing circuit 325. In this case, the vertical scanning circuit 323 distributes an electric charge converted by the photoelectric conversion device to each of the electric charge accumulating units of the pixel 321. In other words, the vertical scanning circuit 323 is one example of a "pixel driving circuit".

The pixel signal processing circuit 325 is a circuit that performs signal processing set in advance (for example, a noise suppression process, an A/D conversion process, or the like) on a voltage signal output to a corresponding vertical signal line from the pixels 321 of each column in accordance with control from the control circuit 322.

The horizontal scanning circuit 324 is a circuit that sequentially outputs signals output from the pixel signal processing circuit 325 to horizontal signal lines in accordance with control from the control circuit 322. In accordance with this, a pixel signal corresponding to the amount of accumulated electric charge corresponding to one frame is sequentially output to the distance image processing unit 4 through the horizontal signal line.

In the following description, it is assumed that the pixel signal processing circuit 325 performs an A/D conversion process, and pixel signals are digital signals.

Figure 3:
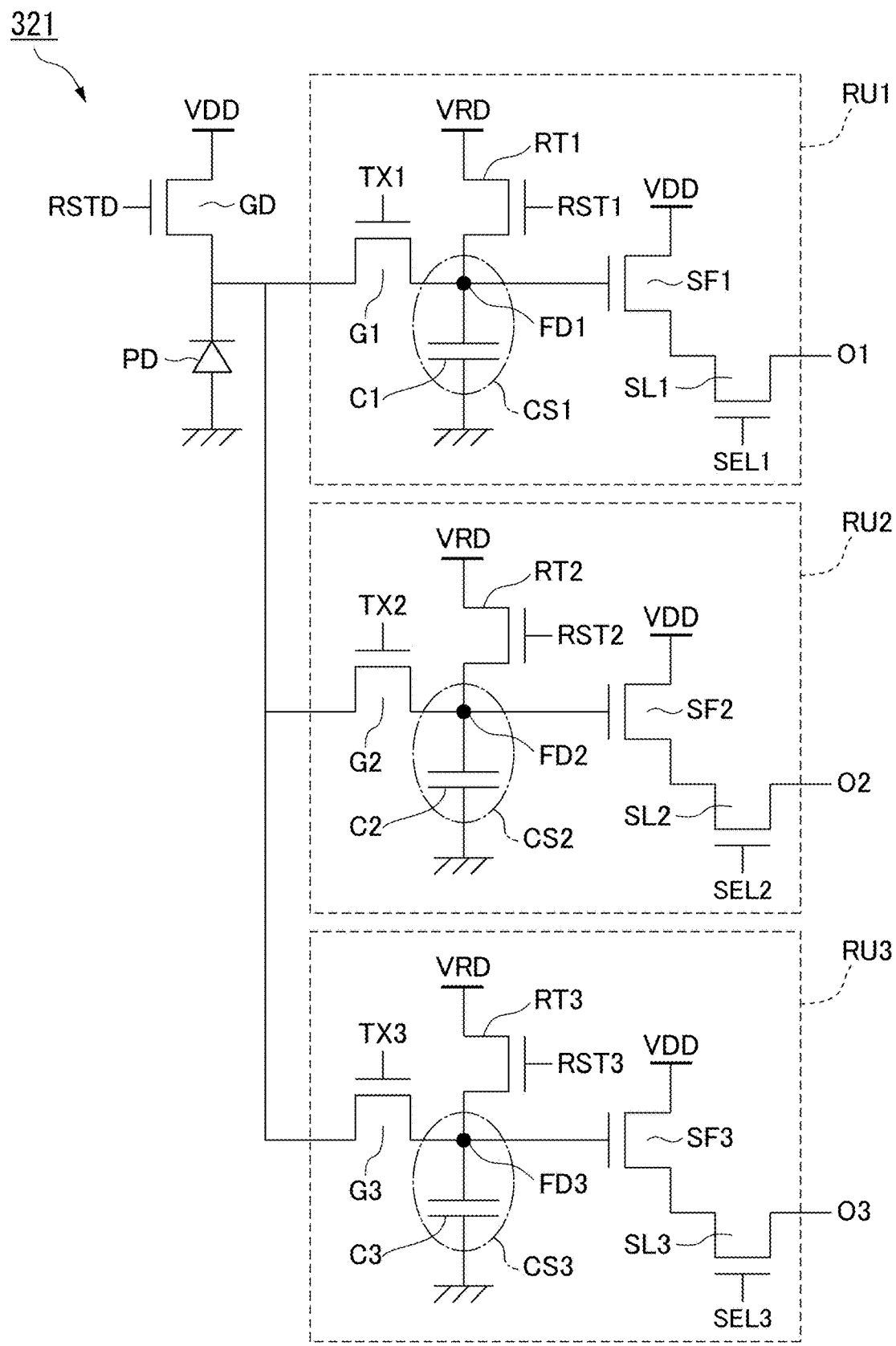
FIG. 3 is a circuit diagram showing an example of a configuration of a pixel disposed in a light reception area of the imaging device used in the distance-image capturing apparatus according to the first embodiment.

Here, the configuration of the pixels 321 disposed within the light reception area 320 included in the distance image sensor 32 will be described. FIG. 3 is a circuit diagram showing an example of the configuration of the pixel 321 disposed within the light reception area 320 of the imaging device (the distance image sensor 32) used in the distance-image capturing apparatus 1 according to the first embodiment of the present invention. FIG. 3 illustrates an example of the configuration of one pixel 321 among a plurality of pixels 321 disposed within the light reception area 320. The pixel 321 is an example of the configuration in which three pixel signal reading units are included.

The pixel 321 includes one photoelectric conversion device PD, a drain gate transistor GD, and three pixel signal reading units RU that output voltage signals from corresponding output terminals O. Each of the pixel signal reading units RU includes a reading gate transistor G, a floating diffusion FD, an electric charge accumulating capacitor C, a reset gate transistor RT, a source follower gate transistor SF, and a selection gate transistor SL. In each of the pixel signal reading units RU, an electric charge accumulating unit CS is composed of the floating diffusion FD and the electric charge accumulating capacitor C.

In addition, in FIG. 3, by assigning numbers "1", "2", and "3" after reference signs "RU" of three pixel signal reading units RU, the individual pixel signal reading units RU can be distinguished from each other. In addition, similarly, also for each constituent element included in any one of the three pixel signal reading units RU, by indicating with a number representing the pixel signal reading unit RU after a reference sign, the pixel signal reading unit RU to which each constituent element corresponds can be represented in a distinguishing manner.

In the pixel 321 shown in FIG. 3, the pixel signal reading unit RU1 that outputs a voltage signal from an output terminal O1 includes a reading gate transistor G1, a floating diffusion FD1, an electric charge accumulating capacitor C1, a reset gate transistor RT1, a source follower gate transistor SF1, and a selection gate transistor SL1. In the pixel signal reading unit RU1, an electric charge accumulating unit CS1 is composed of a floating diffusion FD1 and an electric charge accumulating capacitor C1. The pixel signal reading unit RU2 and the pixel signal reading unit RU3 have configurations similar thereto. The electric charge accumulating unit CS1 is one example of a "first electric charge accumulating unit". The electric charge accumulating unit CS2 is one example of a "second electric charge accumulating unit". The electric charge accumulating unit CS3 is one example of a "third electric charge accumulating unit".

The photoelectric conversion device PD is a photodiode of an embedded type that generates electric charge by performing a photoelectric conversion of incident light and accumulates the generated electric charge. The structure of the photoelectric conversion device PD may be arbitrarily selected. For this reason, the photoelectric conversion device PD, for example, may be either a PN photo diode having a structure in which a P-type semiconductor and an N-type semiconductor are bonded or a PIN photodiode having a structure in which an I-type semiconductor is interposed between a P-type semiconductor and an N-type semiconductor. In addition, the photoelectric conversion device PD is not limited to a photodiode and, for example, may be a photoelectric conversion device of a photo-gate type.

The pixel 321 distributes the electric charge generated by performing a photoelectric conversion of incident light using the photoelectric conversion device PD to the three electric charge accumulating units CS and outputs voltage signals corresponding to the amounts of distributed electric charge to the pixel signal processing circuit 325.

The configuration of the pixel disposed in the distance image sensor 32 is not limited to the configuration including three pixel signal reading units RU as shown in FIG. 3, and the pixel may have a configuration in which a plurality of pixel signal reading units RU are included. In other words, the number of pixel signal reading units RU (electric charge accumulating units CS) included in the pixel disposed in the distance image sensor 32 may be two or four or more.

In addition, in the pixel 321 shown in FIG. 3, one example in which the electric charge accumulating unit CS is composed of the floating diffusion FD and the electric charge accumulating capacitor C is shown. However, the electric charge accumulating unit CS may be configured using at least the floating diffusion FD, and a configuration in which the pixel 321 does not include the electric charge accumulating capacitor C may be employed.

In addition, in the pixel 321 having the configuration shown in FIG. 3, although one example of the configuration including the drain gate transistor GD is shown, a configuration in which no drain gate transistor GD is included may be employed in a case in which electric charge accumulated (remaining) in the photoelectric conversion device PD does not need to be discarded.

Next, a method for driving (controlling) the pixels 321 in the distance-image capturing apparatus 1 will be described with reference to FIG. 12A. FIG. 12A is a timing diagram showing timings of drive signals for driving pixels in a conventional distance-image capturing apparatus.

In FIG. 12A, a timing at which a light pulse PO is emitted, a timing at which reflected light is received, a timing of a drive signal TX1, a timing of a drive signal TX2, a timing of a drive signal TX3, and a timing of a drive signal RSTD are respectively denoted using item names of "Light", "REFRECTION_B", "G1", "G2", "G3", and "GD". In addition, a series of timings of a light reception operation in the distance-image capturing apparatus are denoted using an item name "Camera". In the "Camera", timings at which reading gate transistors G1, G2, and G3 and a drain gate transistor GD come into an on state are respectively denoted as "G1", "G2", "G3", and "GD". The drive signal TX1 is a signal for driving the reading gate transistor G1. This similarly applies also to the drive signals TX2 and TX3.

As shown in FIG. 12A, the light pulse PO is emitted for an emission time To, and reflected light RL is received by the distance image sensor 32 with a delay time Td delayed. The vertical scanning circuit 323 accumulates electric charge in order of the electric charge accumulating units CS1, CS2, and CS3 in synchronization with the emission of the light pulse PO.

First, the vertical scanning circuit 323 causes the reading gate transistor G1 to be the on state. In accordance with this, electric charge acquired through photoelectric conversion using the photoelectric conversion device PD is accumulated in the electric charge accumulating unit CS1 through the reading gate transistor G1. Thereafter, the vertical scanning circuit 323 causes the reading gate transistor G1 to be an off state. In accordance with this, transmission of electric charge to the electric charge accumulating unit CS1 stops. In this way, the vertical scanning circuit 323 accumulates electric charge in the electric charge accumulating unit CS1.

Next, the vertical scanning circuit 323 causes the reading gate transistor G2 to be the on state at the timing at which accumulation of electric charge in the electric charge accumulating unit CS1 ends and starts accumulation of electric charge in the electric charge accumulating unit CS2. Thereafter, a flow of the process of accumulating electric charge in the electric charge accumulating unit CS2 is similar to the flow of the process of accumulating electric charge in the electric charge accumulating unit CS1, and thus a description thereof will be omitted.

On the other hand, the light source unit 2 emits a light pulse PO at a timing at which the reading gate transistor G1 comes into the off state, in other words, a timing at which the reading gate transistor G2 comes into the on state. An emission time To for which the light source unit 2 emits the light pulse PO has the same length as an accumulation period Ta. Here, a period (an accumulation period Ta) in which the reading gate transistor G1 comes into the on state, and electric charge is accumulated in the electric charge accumulating unit CS1 is one example of an "external light accumulation period".

Next, the vertical scanning circuit 323 causes the reading gate transistor G3 to be the on state at the timing at which accumulation of electric charge in the electric charge accumulating unit CS2 ends and starts accumulation of electric charge in the electric charge accumulating unit CS3. Thereafter, a flow of the process of accumulating electric charge in the electric charge accumulating unit CS3 is similar to the flow of the process of accumulating electric charge in the electric charge accumulating unit CS1, and thus a description thereof will be omitted.

Next, the vertical scanning circuit 323 causes the drain gate transistor GD to come into the on state at the timing at which accumulation of electric charge in the electric charge accumulating unit CS3 ends and discharges electric charge. In accordance with this, electric charge acquired through photoelectric conversion using the photoelectric conversion device PD is discarded through the drain gate transistor GD.

The accumulation of electric charge in the electric charge accumulating unit CS using the vertical scanning circuit 323 and the discarding of electric charge acquired through photoelectric conversion performed by the photoelectric conversion device PD as described above are repeatedly performed at another frame. In accordance with this, electric charge corresponding to the amount of light received by the distance-image capturing apparatus 1 in a predetermined time section is accumulated in each electric charge accumulating units CS. The horizontal scanning circuit 324 outputs an electric signal corresponding to the amount of electric charge corresponding to one frame, which is accumulated in each electric charge accumulating unit CS, to the distance calculating unit 42.

On the basis of a relation between the timing at which the light pulse PO is emitted and the timing at which electric charge is accumulated in each electric charge accumulating unit CS, an amount of electric charge corresponding to an external light component such as background light before the emission of the light pulse PO is maintained in the electric charge accumulating unit CS1. In addition, amounts of electric charge corresponding to the reflected light RL and the external light component are respectively distributed and maintained in the electric charge accumulating units CS2 and CS3. A proportion (a distribution ratio) of electric charge distributed in the electric charge accumulating units CS2 and CS3 is a ratio according to the delay time Td until the light pulse PO is reflected on a subject S and is incident to the distance-image capturing apparatus 1.

The distance calculating unit 42 calculates the delay time Td using the following Equation (1) using this principle.

$$Td = To \times (Q3 - Q1)/(Q2 + Q3 - 2 \times Q1) \tag{1}$$

Here, To represents a period in which the light pulse PO is emitted, Q1 represents an amount of electric charge accumulated in the electric charge accumulating unit CS1, Q2 represents an amount of electric charge accumulated in the electric charge accumulating unit CS2, and Q3 represents an amount of electric charge accumulated in the electric charge accumulating unit CS3. In Equation (1), it is premised that a component corresponding to an external light component among amounts of electric charge accumulated in the electric charge accumulating units CS2 and CS3 is the same as the amount of electric charge accumulated in the electric charge accumulating unit CS1.

By multiplying the delay time acquired in Equation (1) by a light speed (velocity), the distance calculating unit 42 calculates a reciprocation distance to the subject S. Then, by calculating ½ of the reciprocation distance calculated as described above, the distance calculating unit 42 acquires the distance to the subject S.

Here, flare light will be described with reference to FIGS. 12B and 12C.

FIG. 12B is a diagram showing a concept of flare light.

As shown in FIG. 12B, a case in which an object B present at a position of which a distance from the distance-image capturing apparatus 1 is relatively long (hereinafter, referred to as being present at a long distance or the like) in a measurement space E that is a measurement target to which the light pulse PO can be emitted is a subject will be considered.

In a case in which the distance to the subject is a long distance, the amount of the reflected light RL is smaller than in a case in which an object present at a position of which a distance from the distance-image capturing apparatus 1 is relatively short is measured. When the amount of the reflected light RL is small, it may be a factor for degrading accuracy of a measured distance. For this reason, in a case in which the distance to a subject is a long distance, it may be considered to improve the accuracy of measurement by increasing the amount of exposure (the amount of light received by the distance image sensor 32) by increasing the number of times of distribution.

However, as shown in a cross-section enlarged view of FIG. 12B, there are cases in which a part of received light is multi-reflected inside the distance-image capturing apparatus 1 when the part of light arrives at the distance image sensor 32 through the lens 31. In this case, light (flare light)

is received at a position different from a position at which reflected light from an object is originally imaged. Such flare light may be a factor degrading the accuracy of measurement.

Particularly, in a case in which an object A is present at a position of which the distance to the distance-image capturing apparatus 1 is at a relatively close position (hereinafter, referred to as a short distance or the like) in addition to a subject (an object B) present at a long distance, when the amount of exposure is increased, the amount of reflected light RL from the object A increases. In this case, the amount of flare light originated from the reflected light RL from the object A becomes large, and which may become a factor largely degrading the accuracy of measurement.

Figure 12C:
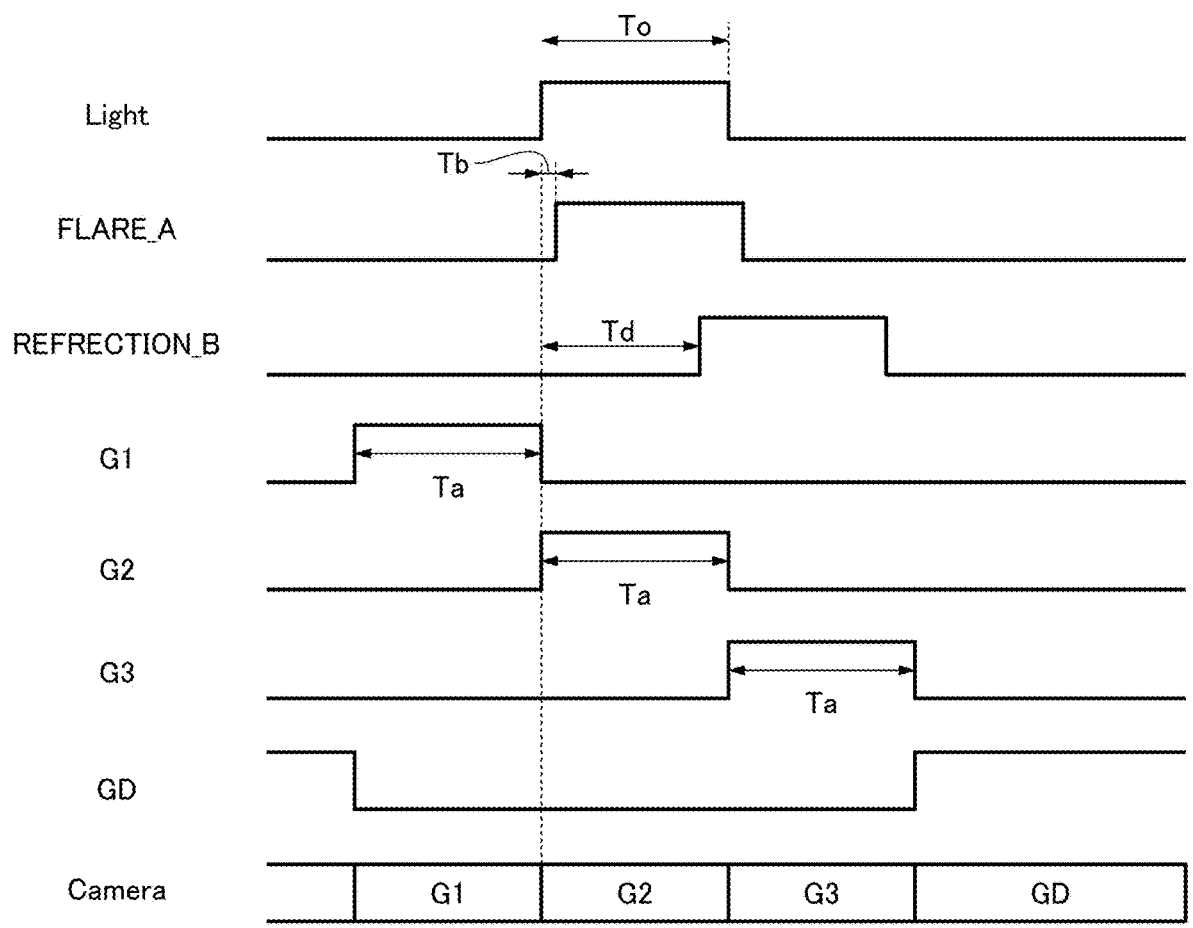
FIG. 12C is a diagram showing degradation of accuracy occurring in a case in which flare light is received in conventional measurement.

FIG. 12C is a diagram showing a case in which flare light is received in conventional measurement. "FLARE_A" shown in FIG. 12C represents flare light originated from reflected light from an object A or the like (an object present at a short distance). "REFRECTION_B" represents reflected light from an object B (a subject present at a long distance). Other than those, items such as "Light" and the like are similar to those shown in FIG. 12A, and thus a description thereof will be omitted.

As shown in FIG. 12C, a light pulse PO is emitted for an emission time To, and flare light with a delay time Tb and reflected light RL with a delay time Td are received by the distance image sensor 32. In this case, an amount of electric charge corresponding to the flare light is accumulated in the electric charge accumulating units CS2 and CS3 in addition to amounts of electric charge corresponding to reflected light RL and an external light component. Even by applying Equation (1) to the amount of electric charge according to flare light being mixed, it is difficult to calculate a distance with high accuracy.

As a countermeasure for solving such a problem, a plurality of measurement modes are defined in this embodiment. In the measurement modes, timings at which electric charge is distributed to electric charge accumulating units with respect to an emission timing of the light pulse PO are set to different timings.

For example, the measurement modes are defined in accordance with ranges of distances that are measurement targets. The ranges of distances that are measurement targets are divided in accordance with a distance calculated in accordance with a delay time Td until reception of reflected light RL after emission of the light pulse PO. For example, the ranges of distances are three ranges including a long distance, an intermediate distance, and a short distance that are divided in accordance with a distance from the distance-image capturing apparatus 1. For example, in a case in which the emission time To of the light pulse PO is 10 ns, the short distance is a range of about 0 to 75 cm, the intermediate distance is a range of about 75 cm to 2.25 m, and the long distance is a range equal to or larger than about 2.25 m.

In addition, the measurement modes are defined in accordance with whether or not a countermeasure for inhibiting occurrence of flare light (hereinafter, referred to as a countermeasure for flare light) is taken. In a case in which an object other than a subject is present at a short distance, a countermeasure for inhibiting occurrence of flare light is taken. On the other hand, in a case in which an object other than a subject is not present at a short distance, a countermeasure for flare light is not taken.

In this embodiment, as measurement modes, for example, a long-distance mode, an intermediate distance mode, an intermediate distance mode, an intermediate distance external light mode, a normal mode 1 (a first normal mode), and a normal mode 2 (a second normal mode) are defined.

The long-distance mode is a mode in which the distance to a subject may be present at a long distance is measured with high accuracy in a situation in which an object other than the subject is present at a short distance. In other words, the long-distance mode is a mode in which a subject present at a long distance is measured with a countermeasure for flare light taken.

The intermediate distance mode is a mode in which the distance to a subject present at an intermediate distance is measured with high accuracy in a situation in which an object other than the subject may be present at a short distance. In other words, the intermediate distance mode is a mode in which a subject present at an intermediate distance is measured with a countermeasure for flare light is taken.

The intermediate distance external light mode is a mode in which an amount of electric charge corresponding to external light is measured at the time of performing measurement in the intermediate distance mode. The intermediate distance external light mode is a mode used in a case in which external light is taken into account at the time of performing measurement in the intermediate distance mode.

The normal mode 1 is a mode in which the distance to a subject present at a long distance is measured in a situation in which an object other than the subject is assumed not to be present at a short distance. In other words, the normal mode 1 is a mode in which a subject present at a long distance is measured with a countermeasure for flare light not taken. The normal mode 1 is a mode in which conventional measurement is performed.

The normal mode 2 is a mode in which the distance to an object present at a short distance is measured. The normal mode 2 is a mode in which conventional measurement is performed and is a mode in which the amount of exposure is inhibited more than in the normal mode 1 (in other words, the number of times of distribution is decreased).

Hereinafter, the long-distance mode, the intermediate distance mode, and the intermediate distance external light mode will be sequentially described.

(Long-Distance Mode)

Figure 4:
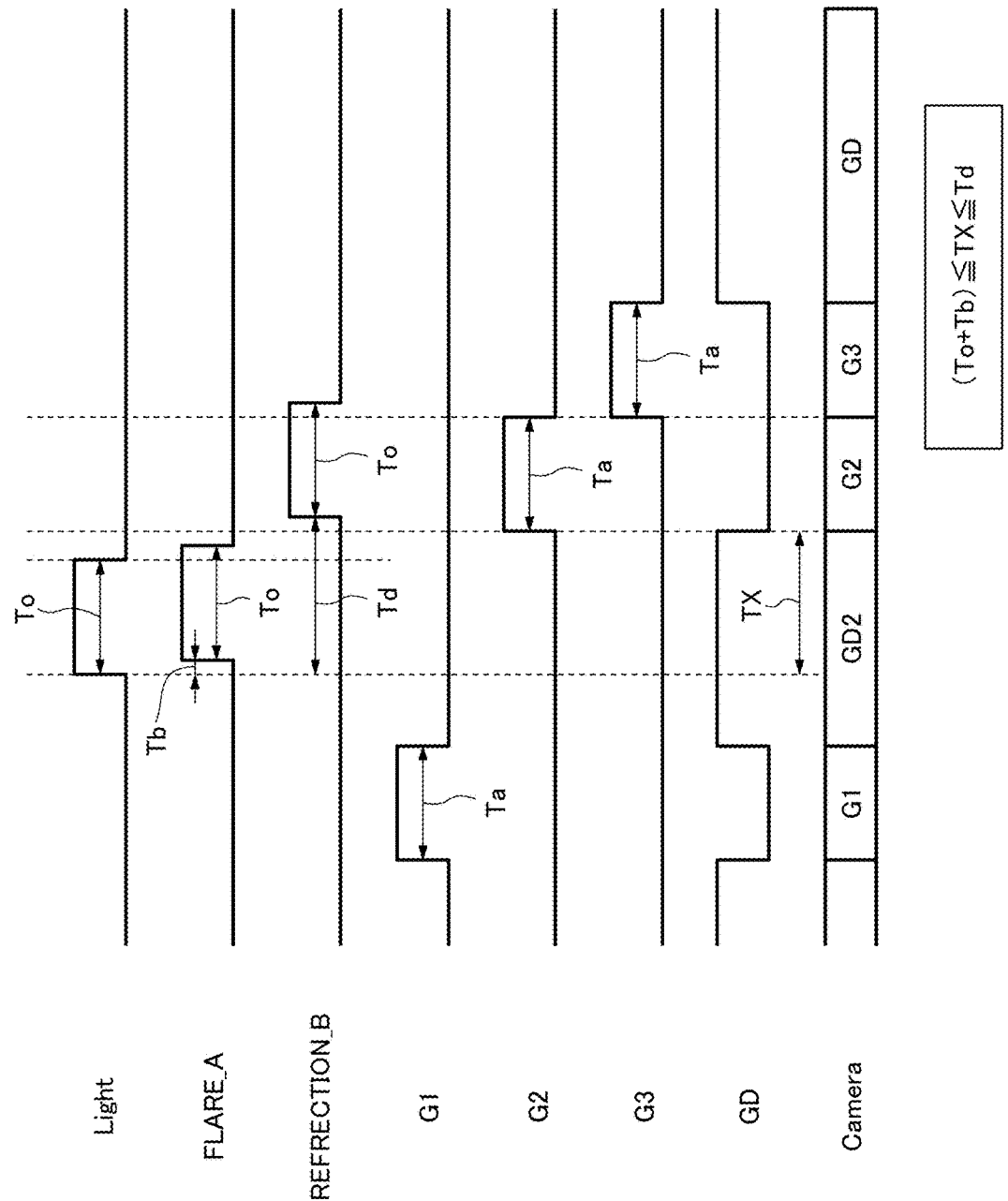
FIG. 4 is a timing diagram showing timings at which pixels are driven in a long-distance mode according to the first embodiment.

First, the long-distance mode will be described with reference to FIG. 4. FIG. 4 is a timing diagram showing timings at which pixels 321 are driven in the long-distance mode according to the first embodiment. In an item "Camera" shown in FIG. 4, a timing at which the drain gate transistor GD comes into the on state between "G1" and "G2" is denoted as "GD2". The other items such as "Light" are similar to those shown in FIG. 12C, and thus a description thereof will be omitted.

As shown in the example shown in FIG. 4, a light pulse PO is emitted for an emission time To, and flare light with a delay time Tb and reflected light RL with a delay time Td are received by the distance image sensor 32.

The long-distance mode is used in a situation in which an object B that is a subject and an object A that becomes a factor causing an occurrence of flare light are assumed to be at a long distance from the distance-image capturing apparatus 1. In other words, the long-distance mode is used in a situation in which it is premised that the delay time Td is longer than the delay time Tb, and the flare light and the reflected light RL are not simultaneously received. In the long-distance mode, on the premise described above, a timing at which a light pulse PO is emitted and a timing at which electric charge is accumulated in the electric charge accumulating unit CS are adjusted such that electric charge originated from flare light is not accumulated.

More specifically, first, before the timing at which the light pulse PO is emitted, the vertical scanning circuit 323 causes the reading gate transistor G1 to be the on state during an accumulation period Ta and accumulates electric charge corresponding to external light in the electric charge accumulating unit CS1.

Next, the vertical scanning circuit 323 causes the drain gate transistor GD to be the on state. In accordance with this, electric charge acquired through photoelectric conversion using the photoelectric conversion device PD is discarded (discharged). Thus, electric charge acquired by performing photoelectric conversion of flare light received while the drain gate transistor GD is the on state is not accumulated in the electric charge accumulating unit CS.

The vertical scanning circuit 323 sets a period in which at least flare light is received (a flare light reception period) as a period in which electric charge acquired through photoelectric conversion is discarded (discharged), in other words, a "non-accumulation period" in which electric charge is not accumulated.

In the long-distance mode, the "flare light reception period" and a "reflected light reception period" are periods not overlapping each other.

The "flare light reception period" is a period until the light pulse emission time To (an emission period) elapses from a time acquired by delaying a time at which the emission of the light pulse PO starts by the delay time Tb. In other words, the "flare light reception period" is a period acquired by delaying the emission time To of the light pulse PO by the delay time Tb. Here, the delay time Tb is one example of a "pulse light delay time".

The "reflected light reception period" is a period until the light pulse emission time To (the emission period) from a time acquired by delaying a time at which emission of the light pulse PO starts by the delay time Td. In other words, the "reflected light reception period" is a period acquired by delaying the emission time To of the light pulse PO by the delay time Td. Here, the delay time Td is one example of a "reflected light delay time".

Next, the vertical scanning circuit 323 sequentially causes the reading gate transistors G2 and G3 to be the on state during an accumulation period Ta at a timing at which the drain gate transistor GD is returned to the off state and distributes the reflected light RL to the electric charge accumulating units CS2 and CS3 to be accumulated in the electric charge accumulating units CS2 and CS3. In accordance with this, electric charge corresponding to external light is accumulated in the electric charge accumulating unit CS1, and electric charge corresponding to the reflected light RL and the external light is accumulated in the electric charge accumulating units CS2 and CS3. Thus, in the long-distance mode, by applying Equation (1) to an electric signal corresponding to amounts of electric charge accumulated in the electric charge accumulating units CS1 to CS3, a distance can be calculated without being influenced by flare light.

In the example shown in FIG. 4, the vertical scanning circuit 323 causes the drain gate transistor GD to be the on state until a period TX elapses from a time point at which emission of the light pulse PO starts from a time point at which the reading gate transistor G1 is caused to be the off state. The period TX is a period satisfying (To+Tb)≤TX≤Td that is equal to or longer than a sum of the emission time To and the delay time Tb and equal to or shorter than the delay time Td.

In this way, in the long-distance mode, the accumulation timings are controlled such that electric charge is not accumulated in a period in which flare light is received, and electric charge is accumulated in a period in which reflected light is received. In accordance with this, even in a situation in which another object A other than a subject may be present at a short distance, the distance to an object B present at a long distance can be measured with high accuracy.

(Intermediate Distance Mode)

Figure 5A:
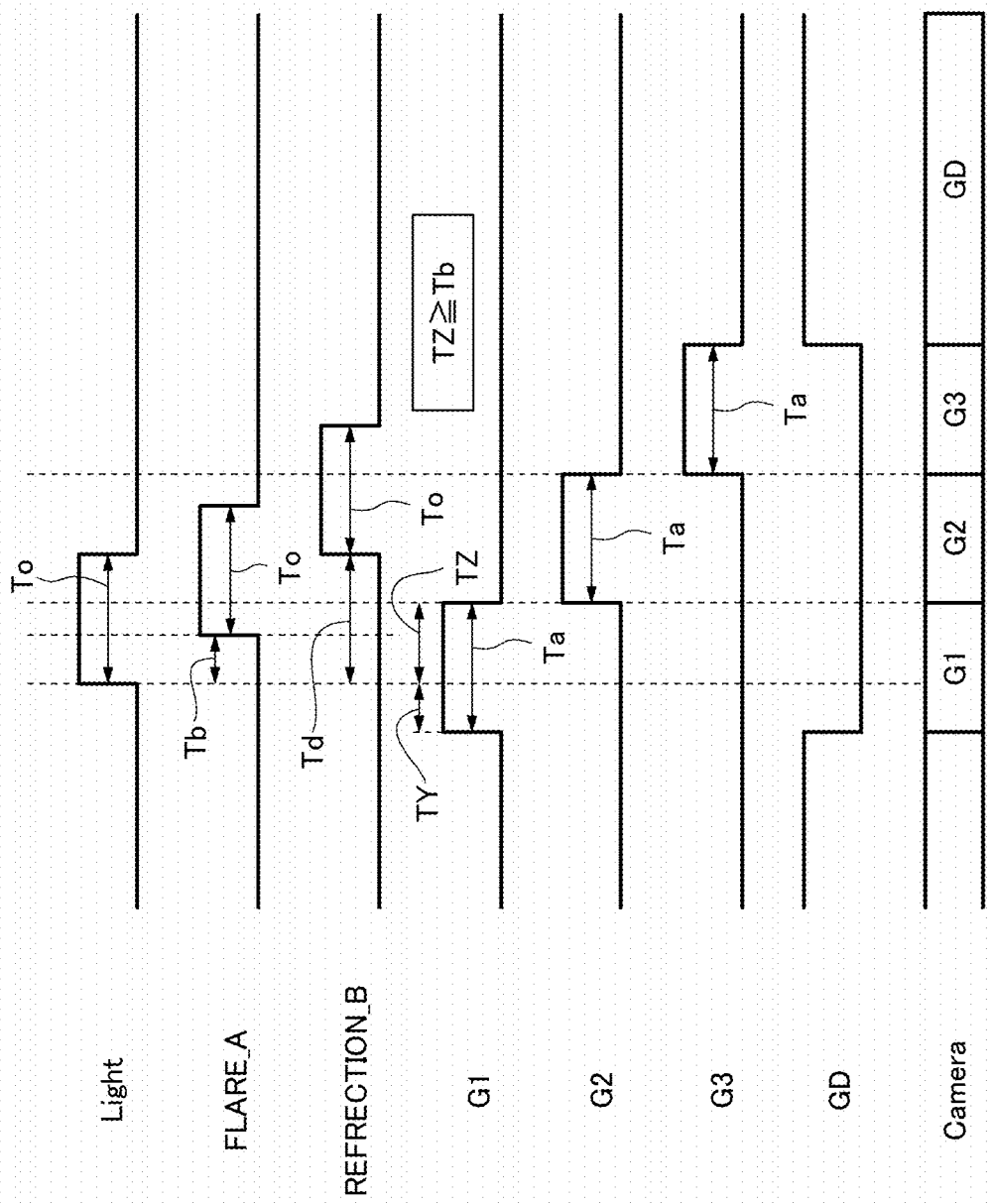
FIG. 5A is a timing diagram showing timings at which pixels are driven in an intermediate distance mode according to the first embodiment.
Figure 5B:
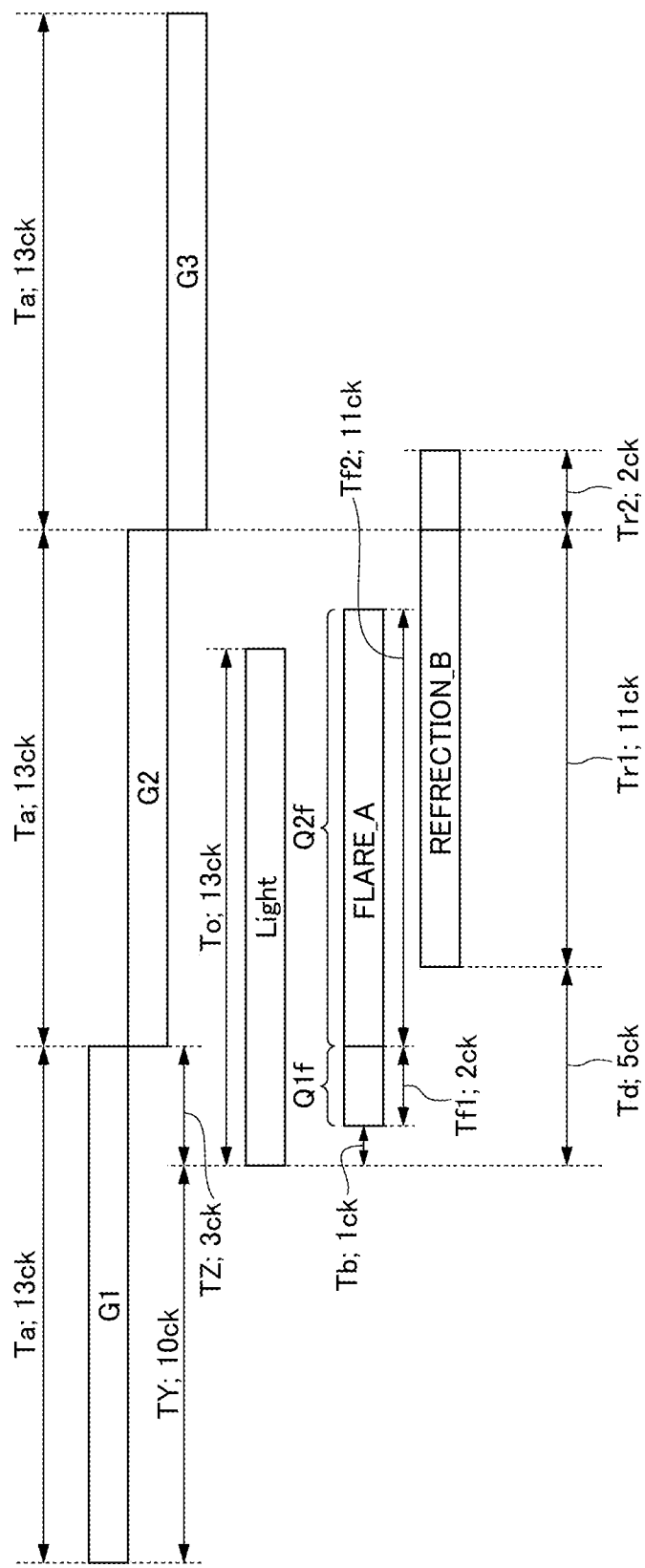
FIG. 5B is a timing diagram showing timings at which pixels are driven in an intermediate distance mode according to the first embodiment.

Next, the intermediate distance mode will be described with reference to FIGS. 5A and 5B. FIGS. 5A and 5B are timing diagrams showing timings at which the pixel 321 is driven in the intermediate distance mode according to the first embodiment. Items such as "Light" and the like in FIGS. 5A and 5B are similar to those shown in FIG. 12C, and thus a description thereof will be omitted.

The intermediate distance mode, as will be described later, does not have the electric charge accumulating unit CS in which electric charge corresponding to only external light is accumulated. In other words, a distance cannot be calculated after an external light component included in the amount of electric charge accumulated in each electric charge accumulating unit CS is extracted, and the external light component is eliminated. For this reason, in an environment in which there is a relatively low influence of an external light component on a result of calculation of a distance, for example, in an environment in which the amount of external light is small, measurement can be performed alone in the intermediate distance mode. In an environment in which the amount of external light is large, and calculation accuracy of a distance is degraded without elimination of an external light component, the distance needs to be calculated after external light is received in the intermediate distance external light mode to be described below or using an arbitrary method, and the amount of electric charge corresponding to external light corresponding to one frame is additionally acquired.

As shown in the example shown in FIG. 5A, a light pulse PO is emitted for an emission time To, and flare light delayed by the delay time Tb and reflected light RL delayed with the delay time Td are received by the distance image sensor 32.

The intermediate distance mode is used in a situation in which an object B that is a subject and an object A that becomes a factor for an occurrence of flare light are assumed to be at a short distance from the distance-image capturing apparatus 1 relative to that in the long-distance mode. In other words, the intermediate distance mode is used in a situation in which it is premised that a difference between the delay time Tb and the delay time Td is smaller than a difference assumed in the long-distance mode, and a period in which flare light and reflected light RL are simultaneously received is present. In the intermediate distance mode, on the premise described above, the timing at which the light pulse PO is emitted and the timing at which electric charge is accumulated in the electric charge accumulating units CS are adjusted such that an amount of electric charge originated from the flare light can be extracted.

In the vertical scanning circuit 323, electric charge corresponding to the flare light is distributed to the electric charge accumulating units CS1 and CS2 to be accumulated in the electric charge accumulating units CS1 and CS2. In addition, in the vertical scanning circuit 323, electric charge corresponding to the reflected light RL is distributed to the electric charge accumulating units CS2 and CS3 to be accumulated in the electric charge accumulating units CS2 and CS3. In other words, the vertical scanning circuit 323 has electric charge corresponding to the amount of light incident to the light receiving unit 3 in the "flare light reception period" distributed to the electric charge accumulating units CS1 and CS2 to be accumulated in the electric charge accumulating units CS1 and CS2. In addition, the vertical scanning circuit 323 has electric charge corresponding to an amount of light incident to the light receiving unit 3 in the "reflected light reception period" distributed to the electric charge accumulating units CS2 and CS3 to be accumulated in the electric charge accumulating units CS2 and CS3.

In the intermediate distance mode, the "flare light reception period" and the "reflected light reception period" at least partially overlap each other.

The "flare light reception period" is a period until the light pulse emission time To (the emission period) elapses from a time acquired by delaying a time at which emission of the light pulse PO starts by the delay time Tb. In other words, the "flare light reception period" is a period acquired by delaying the emission time To of the light pulse PO by the delay time Tb. Here, the delay time Tb is one example of a "pulse light delay time".

The "reflected light reception period" is a period until the light pulse emission time To (the emission period) from a time acquired by delaying a time at which emission of the light pulse PO starts by the delay time Td. In other words, the "reflected light reception period" is a period acquired by delaying the emission time To of the light pulse PO by the delay time Td. Here, the delay time Td is one example of a "reflected light delay time".

More specifically, the vertical scanning circuit 323, first, causes the reading gate transistor G1 to be the on state and accumulates electric charge in the electric charge accumulating unit CS1.

The light source unit 2 starts emission of the light pulse PO at a time point at which a period TY elapses from a time point at which the reading gate transistor G1 changes to the on state. Flare light arrives at the distance-image capturing apparatus 1 at a time point at which a delay time Tb elapses from the time point at which emission of the light pulse PO starts (at an emission start time), and the flare light starts to be received.

The vertical scanning circuit 323 causes the reading gate transistor G1 to be the on state until a period TZ elapses from the time point at which emission of the light pulse PO starts and accumulates electric charge in the electric charge accumulating unit CS1. Here, a value acquired by summing the period TY and the period TZ is a period corresponding to the accumulation period Ta. The vertical scanning circuit 323 performs adjustment such that the period TZ is equal to or longer than the delay time Tb (TZ≥Tb). In accordance with this, "a flare light reception start time" at which reception of flare light starts can be included in the accumulation period Ta of the electric charge accumulating unit CS1, and electric charge corresponding to the flare light can be accumulated in the electric charge accumulating unit CS1.

Next, the vertical scanning circuit 323 sequentially causes the reading gate transistors G2 and G3 to be the on state during the accumulation period Ta at a timing at which accumulation of electric charge in the electric charge accumulating unit CS1 ends and accumulates electric charge in the electric charge accumulating units CS2 and CS3. In accordance with this, electric charge corresponding to the flare light and the external light is distributed to the electric charge accumulating units CS1 and CS2 to be accumulated in the electric charge accumulating units CS1 and CS2. In addition, electric charge corresponding to the reflected light RL and the external light is distributed to the electric charge accumulating units CS2 and CS3 to be accumulated in the electric charge accumulating units CS2 and CS3.

The distance calculating unit 42 extracts a flare light component according to the flare light in the amount of electric charge accumulated in the electric charge accumulating unit CS2 on the basis of an amount of electric charge corresponding to the flare light accumulated in the electric charge accumulating unit CS1. The distance calculating unit 42 calculates a flare light component $Q2f$ of the amount of electric charge accumulated in the electric charge accumulating unit CS2 using the following Equation (2).

$$Q2f = K \times Q1 \tag{2}$$

Here, $Q2f$ represents an amount of electric charge corresponding to the flare light component in the amount of electric charge accumulated in the electric charge accumulating unit CS2, $Q1$ represents an amount of electric charge accumulated in the electric charge accumulating unit CS1, and K represents a constant. The constant K is a constant that is uniquely determined in accordance with a time period relation between a timing at which the accumulation period Ta of the electric charge accumulating unit CS1 ends and a timing at which reception of flare light starts.

Here, a method for determining the constant K will be described with reference to FIG. 5B. FIG. 5B illustrates an example of a case in which both the accumulation period Ta and the emission time To are composed of 13 clocks (13 ck). In addition, FIG. 5B illustrates an example in which emission of a light pulse PO starts after 10 clocks (10 ck) from a time point at which the reading gate transistor G1 comes into the on state in the intermediate distance mode.

As shown in FIG. 5B, in a case in which emission of flare light starts after one clock (Tb; 1 ck) from a time point at which emission of a light pulse PO starts, electric charge corresponding to an amount of received light corresponding to two clocks in flare light corresponding to 13 clocks is accumulated in the electric charge accumulating unit CS1. In addition, electric charge corresponding to an amount of received light corresponding to 11 clocks in the flare light corresponding to 13 clocks is accumulated in the electric charge accumulating unit CS2. In this case, the following Equation (3) is satisfied.

$$Q2f = 11/2 \times Q1f \tag{3}$$

Here, $Q2f$ is an amount of electric charge of a flare light component included in the amount of electric charge accumulated in the electric charge accumulating unit CS2. $Q1f$ is an amount of electric charge of a flare light component included in the amount of electric charge accumulated in the electric charge accumulating unit CS1. In an environment in which external light has no influence on a result of calculation of a desired distance (for example, an environment in which the amount of the external light is small), the amount of electric charge $Q1f$ may be regarded as the amount of electric charge accumulated in the electric charge accumulating unit CS1, in other words, the amount of electric charge $Q1$ represented in Equation (2). "11/2" represented in Equation (3) corresponds to the constant K represented in Equation (2).

In this way, the constant K is determined on the basis of a time relation between a timing at which the accumulation period Ta of the electric charge accumulating unit CS1 ends and a timing at which reception of flare light starts. The timing at which reception of flare light starts is determined in accordance with the distance to the object A (a short distance object) that becomes a factor for an occurrence of flare light present at a short distance. In other words, the constant K is a constant that is determined in accordance with the distance to a short distance object.

The distance-image capturing apparatus 1 measures the distance to the short distance object, for example, in the normal mode 2. In this case, before or after measurement using the intermediate distance mode, the distance-image capturing apparatus 1 measures the distance to a short distance object in the normal mode 2. In addition, in this case, the distance-image capturing apparatus 1 stores a table in which the distance to a short distance object and a constant K are associated with each other in advance.

Then, by referring to the table on the basis of the distance to the short distance object measured in the normal mode 2, the distance calculating unit 42 acquires a constant K corresponding to the measured distance to the short distance object. The distance calculating unit 42 applies the acquired constant K and the amounts of electric charge of the electric charge accumulating units CS1 and CS2 acquired in the intermediate distance mode to Equation (2). In this way, the distance calculating unit 42 can extract a flare light component included in the amount of electric charge accumulated in the electric charge accumulating unit CS2.

Then, by subtracting the extracted flare light component from the amount of electric charge accumulated in the electric charge accumulating unit CS2, the distance calculating unit 42 calculates an amount of electric charge corresponding to the reflected light RL accumulated in the electric charge accumulating unit CS2. The distance calculating unit 42 can calculate a delay time Td by applying the calculated amount of electric charge to the amount of electric charge Q2 represented in Equation (1) and calculate the distance to the object B using the calculated delay time Td. At this time, the amount of electric charge corresponding to external light (an amount of electric charge corresponding to the amount of electric charge Q1 represented in Equation (1)) is 0 (zero). The influence of the flare light component is eliminated in the distance to the object B that has been acquired in this way, and thus degradation of accuracy of a distance originated from the flare light can be inhibited. As described above, in an environment in which the amount of external light is large, calculation of a distance needs to be performed with an amount of electric charge corresponding to the external light excluded, and thus it is necessary to receive external light in the intermediate distance external light mode to be described below or using an arbitrary method and additionally acquire an amount of electric charge corresponding to external light corresponding to one frame.

(Intermediate Distance External Light Mode)

Figure 6:
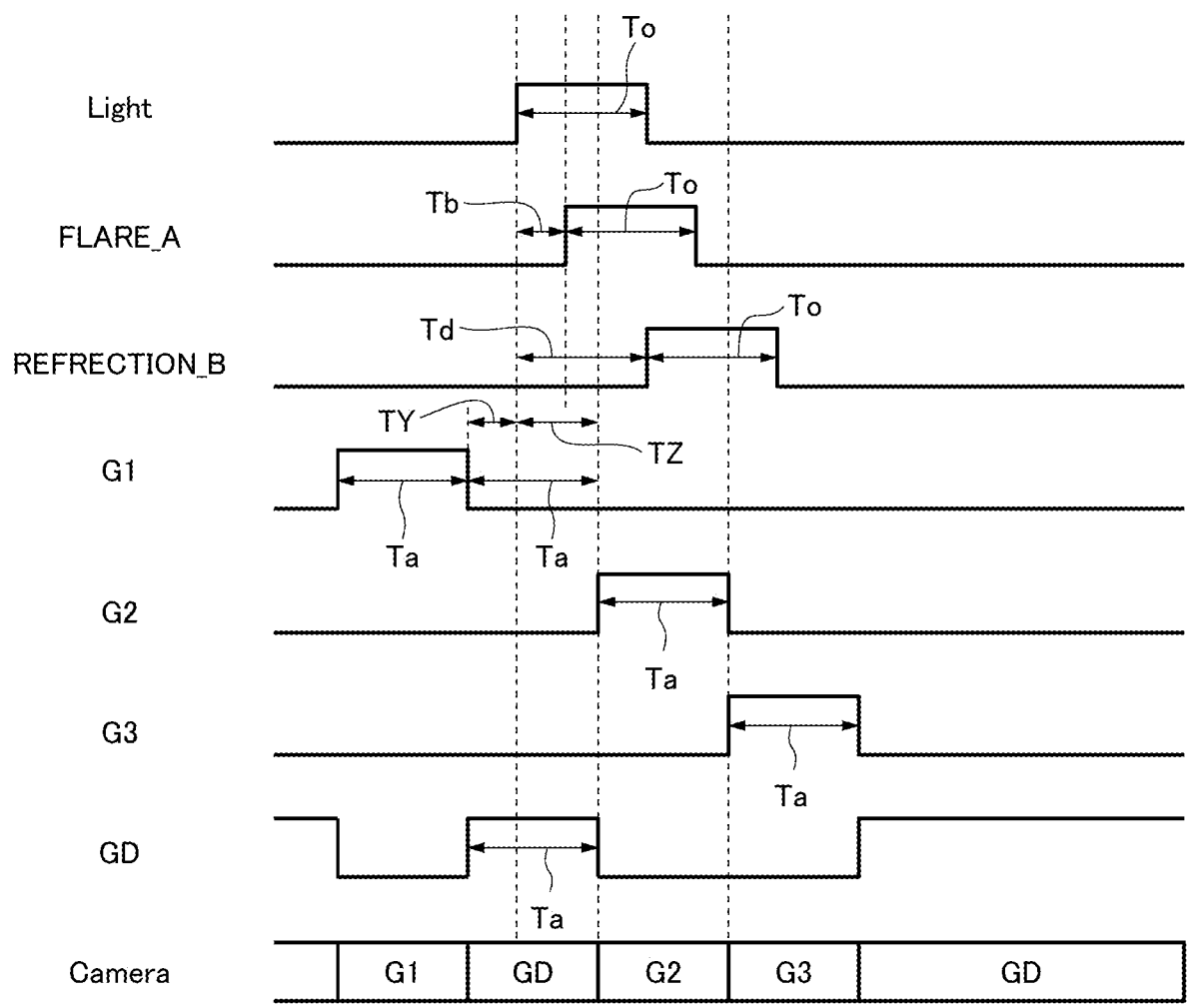
FIG. 6 is a timing diagram showing timings at which pixels are driven in an intermediate distance external light mode according to the first embodiment.

Next, the intermediate distance external light mode will be described with reference to FIG. 6. FIG. 6 is a timing diagram showing timings at which pixels 321 are driven in the intermediate distance external light mode according to the first embodiment. Items such as "Light" and the like in FIG. 6 are similar to those shown in FIG. 12C, and thus a description thereof will be omitted. In addition, emission of a light pulse PO, timing relations of reception of flare light and reception of reflected light RL in FIG. 6 are similar to those shown in FIG. 5A, and thus a description thereof will be omitted.

In the intermediate distance external light mode, a timing at which the electric charge accumulating unit CS1 is caused to be the on state is advanced by an accumulation period Ta, which is different from the intermediate distance mode. On the other hand, in the intermediate distance external light mode, a timing at which a light pulse PO is emitted and timings at which the electric charge accumulating units CS2 and CS3 are caused to be the on state are the same timings of the intermediate distance mode.

By advancing the timing at which the electric charge accumulating unit CS1 is caused to be the on state by the accumulation period Ta, an amount of electric charge corresponding to external light is accumulated in the electric charge accumulating unit CS1 in the intermediate distance external light mode. In addition, the timing at which a light pulse PO is emitted and the timings at which the electric charge accumulating units CS2 and CS3 are caused to be the on state are the same timings of the intermediate distance mode. In accordance with this, with a distribution ratio similar to that of the intermediate distance mode, electric charge corresponding to the flare light and the reflected light RL is accumulated in the electric charge accumulating unit CS2, and electric charge corresponding to the reflected light RL is accumulated in the electric charge accumulating unit CS3.

(Method for Calculating Distance Using Intermediate Distance Mode)

Figure 7:
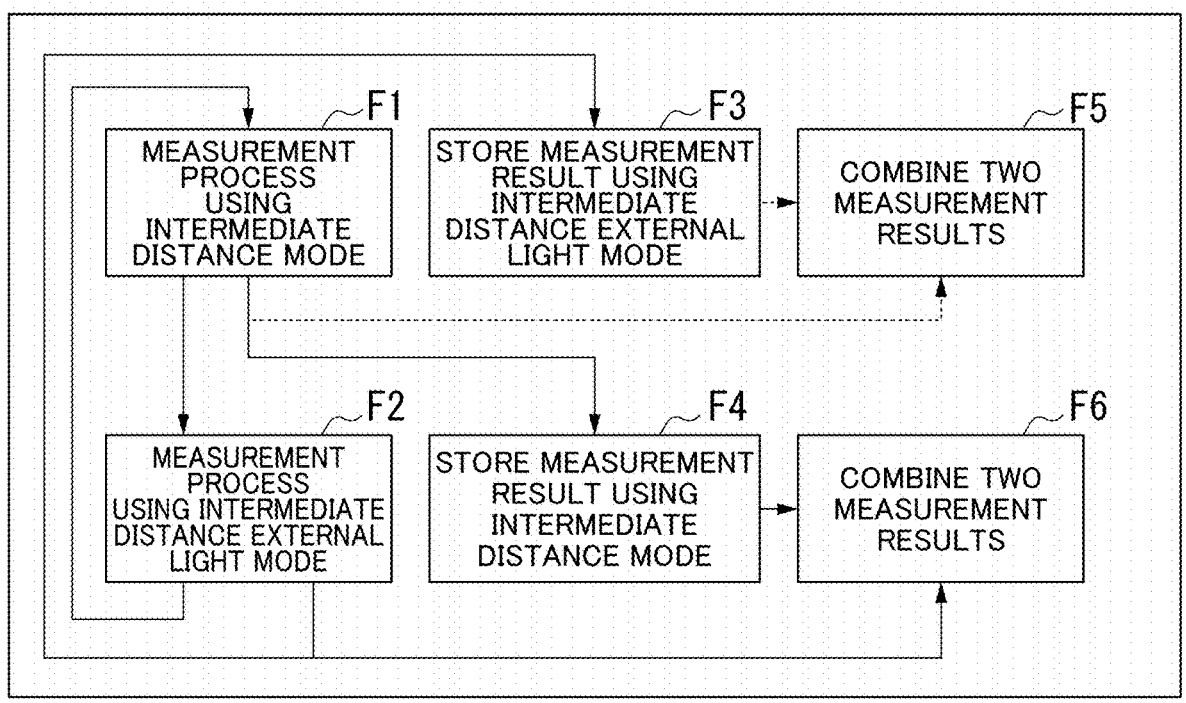
FIG. 7 is a diagram showing frame compositions in the intermediate distance mode and an intermediate distance external light mode according to the first embodiment.

Here, a method for calculating the distance to the object B as a subject present at an intermediate distance using measurement results of the intermediate distance mode and the intermediate distance external light mode will be described with reference to FIG. 7. FIG. 7 is a diagram showing a process of calculating a distance using measurement results of the intermediate distance mode and the intermediate distance external light mode that is performed by the distance-image capturing apparatus 1 according to the first embodiment.

As shown in FIG. 7, the distance-image capturing apparatus 1 alternately repeats measurement of one frame using the intermediate distance mode (a process F1) and measurement of one frame using the intermediate distance external light mode (a process F2).

The distance-image capturing apparatus 1 stores at least the amount of electric charge Q1$gf$ in the process result according to the process F1 in a frame memory and temporarily maintains a measurement result using the intermediate distance mode (the process F4). In the process result according to the process F1, the amount of electric charge Q1$gf$ corresponding to the flare light and the external light according to a distribution ratio corresponding to one frame, the amount of electric charge Q2$grf$ corresponding to the flare light, the reflected light RL, and the external light according to a distribution ratio corresponding to one frame, and the amount of electric charge Q3$gr$ corresponding to the reflected light RL and the external light according to a distribution ratio corresponding to one frame are included.

The distance-image capturing apparatus 1 stores at least the amount of electric charge Q1$g$ in the process result according to the process F2 in the frame memory and temporarily maintains the measurement result using the intermediate distance external light mode (the process F3). In the process result according to the process F2, the amount of electric charge Q1$g$ corresponding to the external light corresponding to one frame, the amount of electric charge Q2$grf$ corresponding to the flare light, the reflected light RL, and the external light according to a distribution ratio corresponding to one frame, and the amount of electric charge Q3gr corresponding to the reflected light RL and the external light according to a distribution ratio corresponding to one frame are included.

The distance-image capturing apparatus 1 combines the two measurement results of the intermediate distance mode and the intermediate distance external light mode according to the process result according to the process F3 and the process result according to the process F1 (the process F5).

In a case in which only the amount of electric charge Q1g of the intermediate distance external light mode in the process result according to the process F3 is stored in the frame memory, combination is performed using the amount of electric charge Q1g and the amount of electric charge Q1gf, the amount of electric charge Q2grf, and the amount of electric charge Q3gr of the intermediate distance mode as a process result according to the process F1.

In a case in which the amount of electric charge Q1g, the amount of electric charge Q2grf, and the amount of electric charge Q3gr of the intermediate distance external light mode are stored in the frame memory, combination is performed using the amounts of electric charge Q1g, Q2grf, and Q3gr and the amount of electric charge Q1gf of the intermediate distance mode.

Alternatively, in a case in which the amount of electric charge Q1g, the amount of electric charge Q2grf, and the amount of electric charge Q3gr of the intermediate distance external light mode are stored in the frame memory, combination is performed using the amount of electric charge Q1gf, the amount of electric charge Q2grf, and the amount of electric charge Q3gr of the intermediate distance mode. In this case, in a combination result according to the process F5, the amount of electric charge Q1g corresponding to external light corresponding to one frame using the intermediate distance external light mode, the amount of electric charge Q1gf corresponding to flare light and external light according to a distribution ratio corresponding to one frame using the intermediate distance mode, a value acquired by combining (for example, averaging) amounts of electric charge corresponding to the flare light, the reflected light RL, and the external light according to a distribution ratio corresponding to two frames using the intermediate distance mode and the intermediate distance external light mode, and a value acquired by combining (for example, averaging) amounts of electric charge corresponding to reflected light RL and external light according to a distribution ratio corresponding to two frames of the intermediate distance mode and the intermediate distance external light mode are included.

The distance-image capturing apparatus 1 combines two measurement results of the intermediate distance mode and the intermediate distance external light mode using the process result according to the process F4 and the process result according to the process F2 (process F6). In a result of combination according to the process F6, a result similar to the result of the combination according to the process F5 is included.

By applying the following Equation (4) to the result of combination calculated in accordance with the process F5 (or the process F6), the distance-image capturing apparatus 1 calculates a delay time Td until the light pulse PO is reflected on the object B and is incident to the distance-image capturing apparatus 1.

$$Td = To \times Q3r / (Q2r + Q3r) \quad (4)$$

Here, To represents a period during which the light pulse PO is emitted, Q3r represents a reflected light component in the amount of electric charge Q3 accumulated in the electric charge accumulating unit CS3, and Q2r represents a reflected light component in the amount of electric charge Q2 accumulated in the electric charge accumulating unit CS2.

When the amount of electric charge of an external light component in the amount of electric charge Q3 accumulated in the electric charge accumulating unit CS3 is denoted by Q3g, the amount of electric charge Q3r is represented using the following Equation (5).

$$Q3r = Q3 - Q3g \quad (5)$$

When the amount of electric charge of an external light component in the amount of electric charge Q2 accumulated in the electric charge accumulating unit CS2 is denoted by Q2g, and the flare light component therein is denoted by Q2f, the amount of electric charge Q2r is represented using the following Equation (6).

$$Q2r = Q2 - Q2g - Q2f \quad (6)$$

The amounts of electric charge Q2g and the amount of electric charge Q3g are the same as the amount of electric charge accumulated in the electric charge accumulating unit CS1 in the intermediate distance external light mode. In addition, the amount of electric charge Q2f is a constant K times the flare light component in the amount of electric charge accumulated in the electric charge accumulating unit CS1 extracted in the intermediate distance mode.

Modified Example of Intermediate Distance External Light Mode

Here, a modified example of the intermediate distance external light mode will be described. In this modified example, at the conventional measurement timing as shown in FIG. 12A, measurement is performed without emitting a light pulse PO. In accordance with this, electric charge corresponding to one frame corresponding to the amount of external light can be accumulated in each of the electric charge accumulating units CS1 to CS3. In a case in which measurement is performed in an environment such as an indoor place in which a change in the amount of external light is smaller than that of an outdoor place, it is preferable to perform measurement according to this modified example. In addition, it is preferable to update the amount of the external light by repeatedly performing measurement according to this modified example regularly.

Modified Example of Method for Calculating Constant K

Figure 8A:
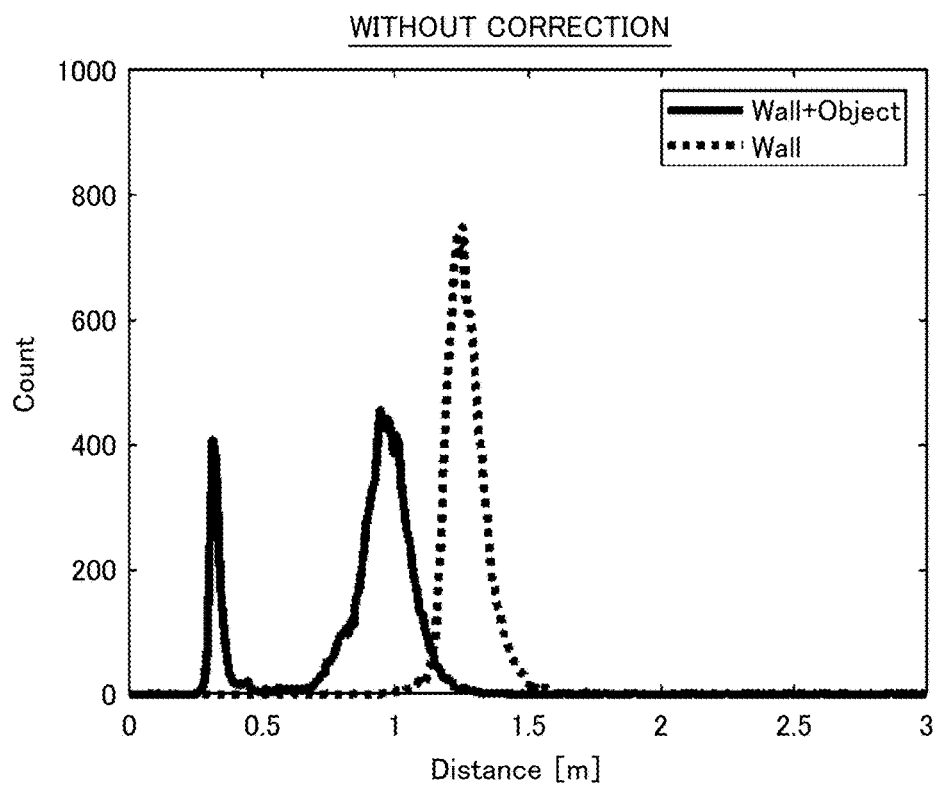
FIG. 8A is a diagram showing a modified example of the intermediate distance mode according to the first embodiment.

Here, a modified example of the method for calculating a constant K will be described with reference to FIGS. 8A and 8B (hereinafter referred to as FIG. 8A and the like). In this modified example, the constant K is calculated using a result measured in advance. FIG. 8A and the like are diagrams showing the modified example of the method for calculating a constant K. In FIG. 8A and the like, a measurement result (distance) for each pixel is represented using a histogram. In FIG. 8A and the like, the horizontal axis represents a distance (Distance [m]), and the vertical axis represents the number (Count) of pixels. In FIG. 8A and the like, an object B is assumed to be a wall, and the distance to the wall is measured.

In FIG. 8A and the like, results of measurements of the distance to the object B (denoted as Wall) in both a case in which a short distance object A (denoted as Object) is present in a measurement area (Wall+Object) and a case in which no short distance object is present (Wall) are shown. FIG. 8A illustrates a measurement result before elimination of flare light (no correction), and FIG. 8B illustrates a measurement result after elimination of flare light (flare correction).

As shown in FIG. 8A, in the measurement of only the object B (Wall), a peak of a histogram appears near a distance of 1.2 m. In other words, the distance to the object B is about 1.2 m.

On the other hand, in the measurement of the object B and the short distance object A (Wall+Object), a peak representing a distance (0.3 m to 0.4 m) to the short distance object A and a peak near a distance 1.0 m appear. The peak near the distance 1.0 m represents that the distance to the object B is measure as being shorter than an actual distance due to flare light originated from the short distance object A mixed into reflected light of the object B.

Figure 8B:
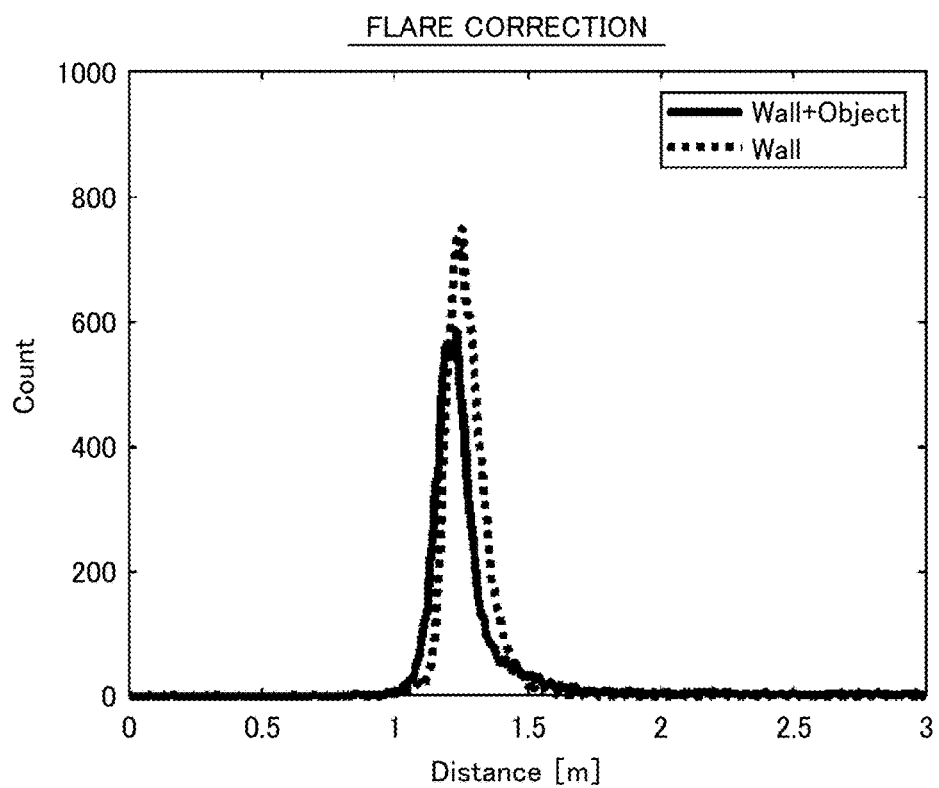
FIG. 8B is a diagram showing a modified example of the intermediate distance mode according to the first embodiment.

FIG. 8B illustrates a result of calculation of a distance after a search for such a constant K that the peak near 1.0 m shown in FIG. 8A is shifted to near 1.2 m is performed and a flare light component is eliminated using the retrieved constant K. By calculating the constant K using a statistical technique in this way, the distance can be calculated with higher accuracy.

Here, effects according to this modified example will be described with reference to FIGS. 9A to 9F. FIGS. 9A to 9F are diagrams showing effects of measurement using the intermediate distance mode.

Figure 9A:
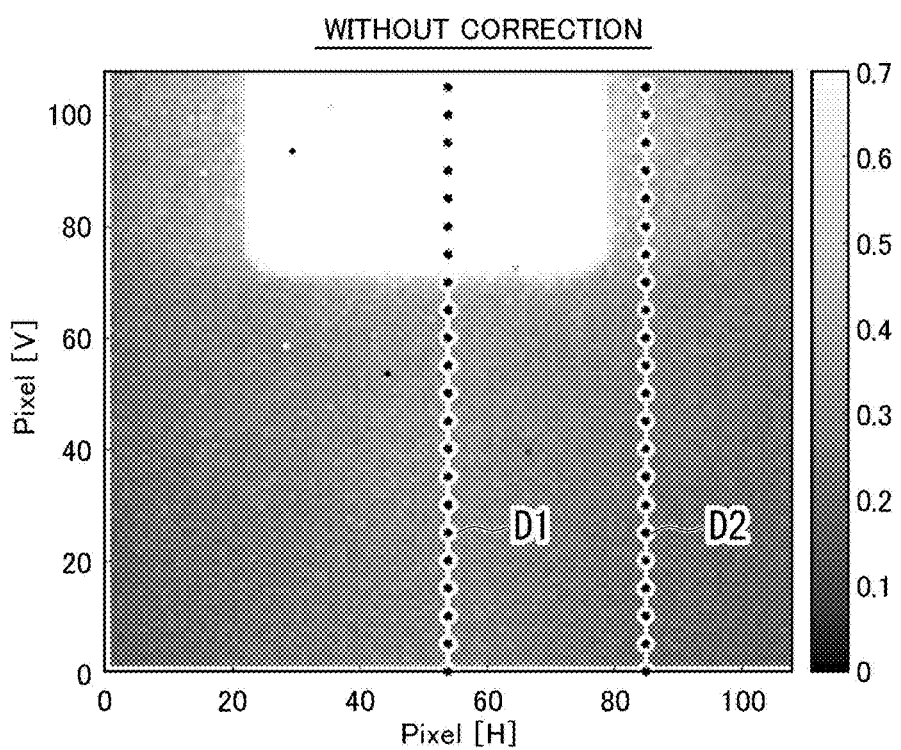
FIG. 9A is a diagram showing an effect of the intermediate distance mode according to the first embodiment.
Figure 9B:
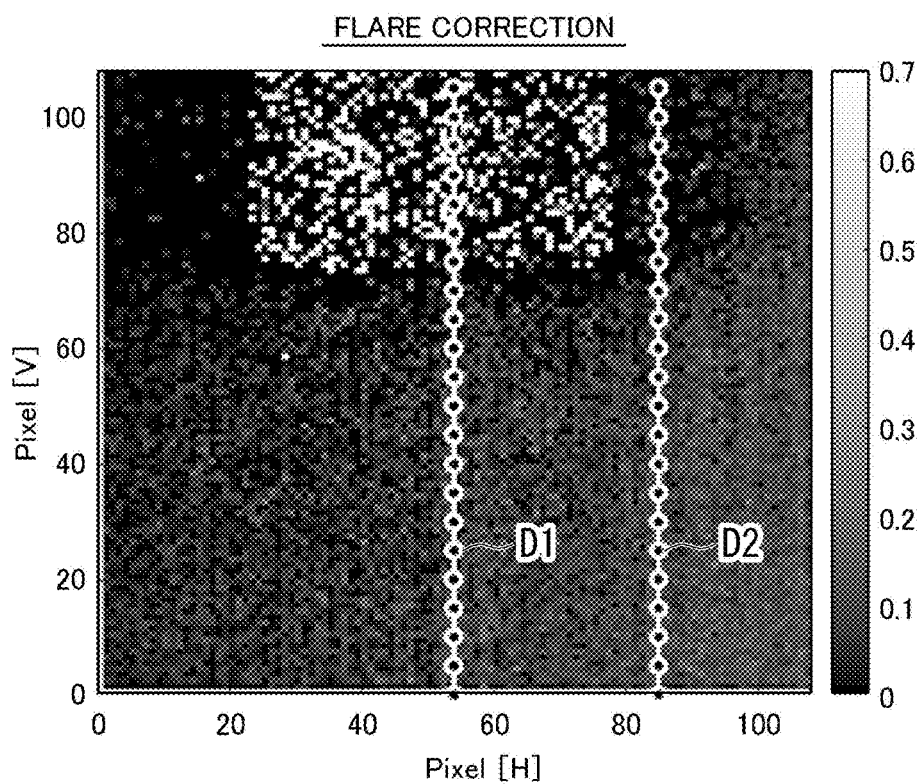
FIG. 9B is a diagram showing an effect of the intermediate distance mode according to the first embodiment.

In FIGS. 9A and 9B, images (differential images) in which differences of distances for pixels are set as pixel values are shown using a distance image acquired by capturing only an object B and a distance image acquired by capturing the object B and a short distance object A. FIG. 9A is a differential image before elimination of a flare light component (no correction), and FIG. 9B is a differential image after elimination of a flare light component (flare correction). In FIGS. 9A and 9B, the horizontal axis represents pixels (Pixel(H)) in the horizontal direction, the vertical axis represents pixels (Pixel(V)) in the vertical direction, and indices of difference values are shown as gray scales to the right side of the differential image and indicate that the difference becomes larger as the gray becomes brighter.

Reference signs D1 and D2 will be described with reference to a drawing to be described below.

As shown in FIG. 9A, in a case in which correction is not performed, the entire object B (wall) becomes a bright gray and illustrates that there is a difference in the distance. Particularly, an area in the vicinity of the short distance object A (left and right sides and a lower side of the short distance object A) becomes a brighter gray, and a difference in the distance in this area is calculated to be large. On the other hand, as shown in FIG. 9B, in a case in which flare correction is performed, the entire object B (wall) becomes a dark gray, and a difference in the distance is close to zero as a whole.

Figure 9C:
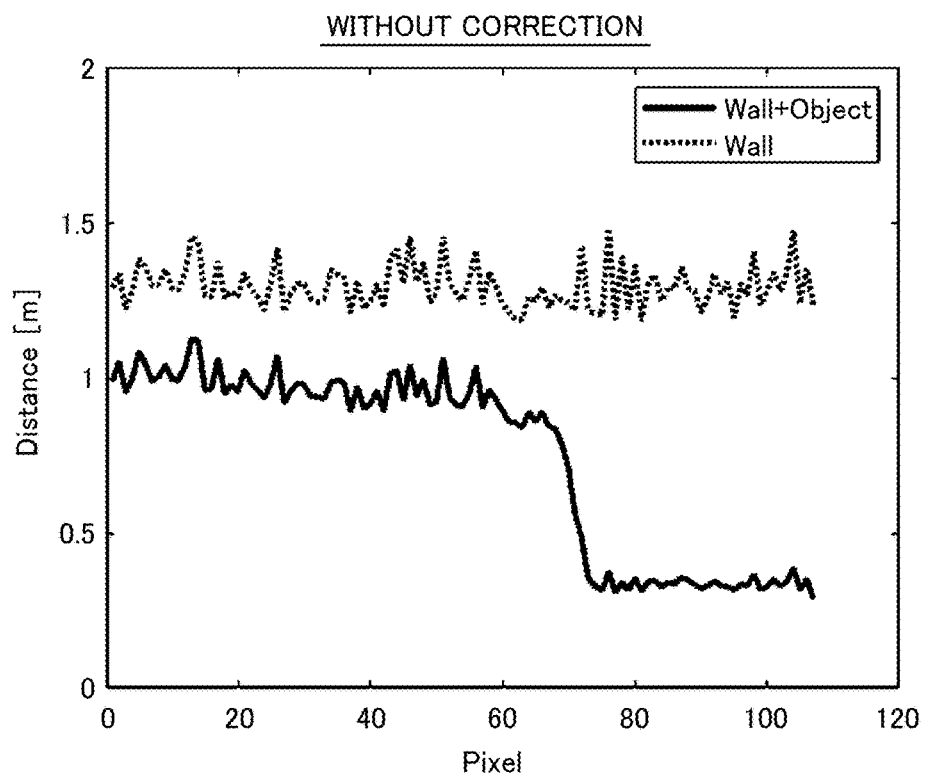
FIG. 9C is a diagram showing an effect of the intermediate distance mode according to the first embodiment.
Figure 9D:
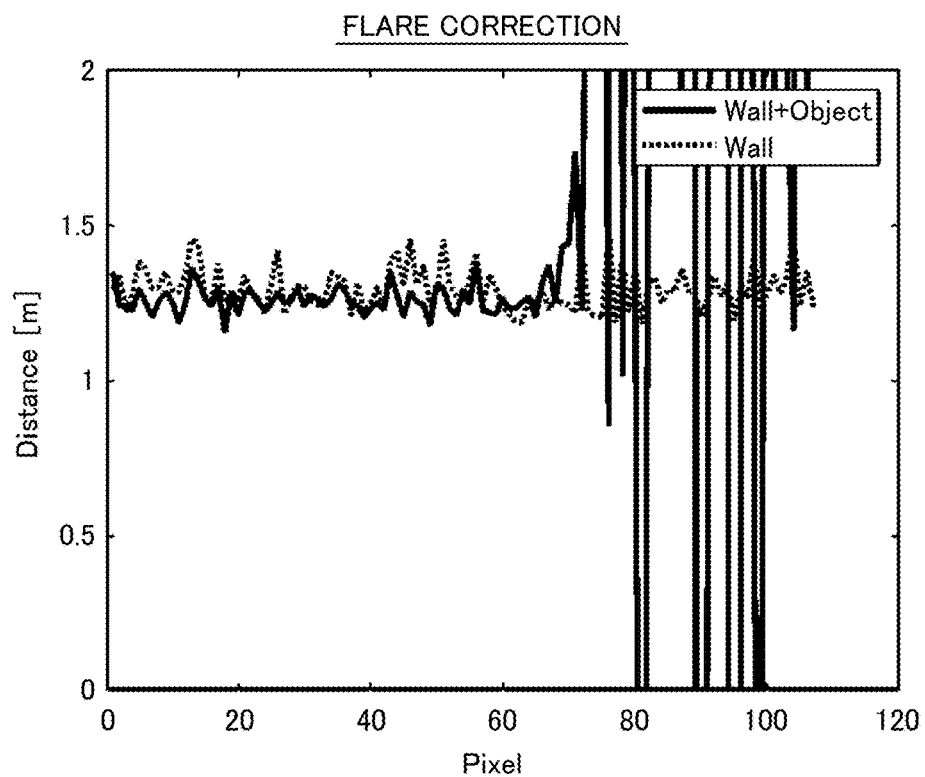
FIG. 9D is a diagram showing an effect of the intermediate distance mode according to the first embodiment.

In FIGS. 9C and 9D, relations between pixels of vertical cross-sections (D1) of FIGS. 9A and 9B and distances are shown. FIG. 9C illustrates a result acquired using a distance image before elimination of a flare light component (no correction), and FIG. 9D illustrates a result acquired using a distance image after elimination of the flare light component (flare correction). In FIGS. 9C and 9D, the horizontal axis represents a pixel (Pixel), and the vertical axis represents a distance (Distance [m])).

As shown in FIG. 9C, in a case in which correction is not performed, a difference of 30 cm to 40 cm occurs between a case in which the short distance object A is absent (a dotted line) and a case in which the short distance object A is present (a solid line). On the other hand, as shown in FIG. 9D, in a case in which flare correction is performed, a case in which the short distance object A is absent (the dotted line) and a case in which the short distance object is present (the solid line) almost overlap each other in an area in which the short distance object A is not present, and the difference decreases.

Figure 9E:
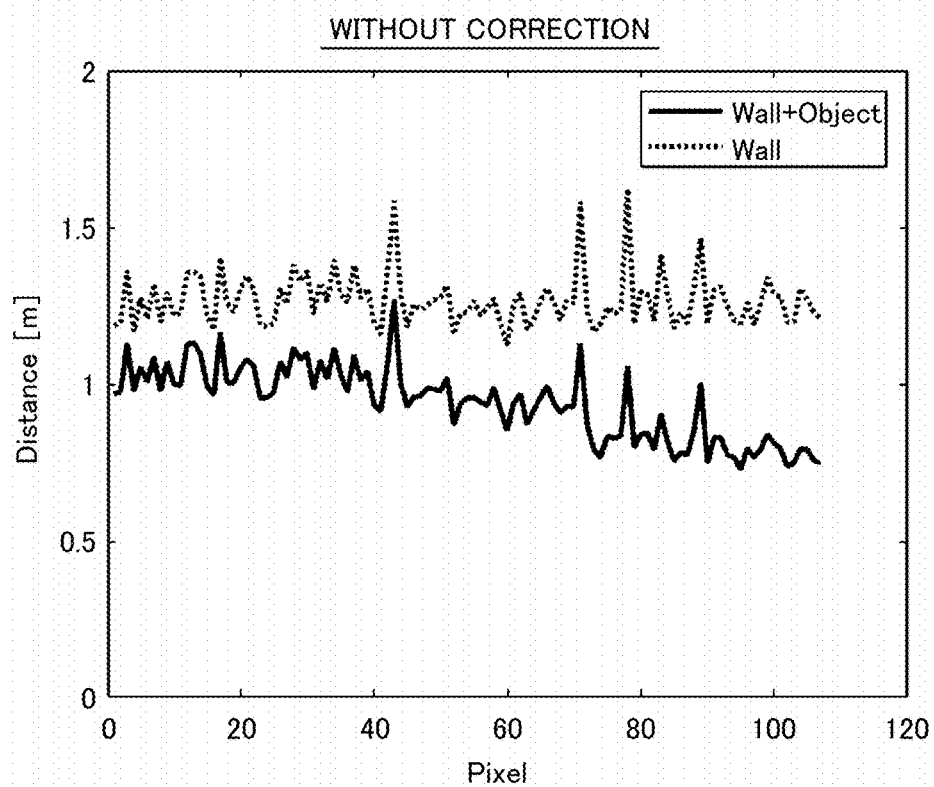
FIG. 9E is a diagram showing an effect of the intermediate distance mode according to the first embodiment.
Figure 9F:
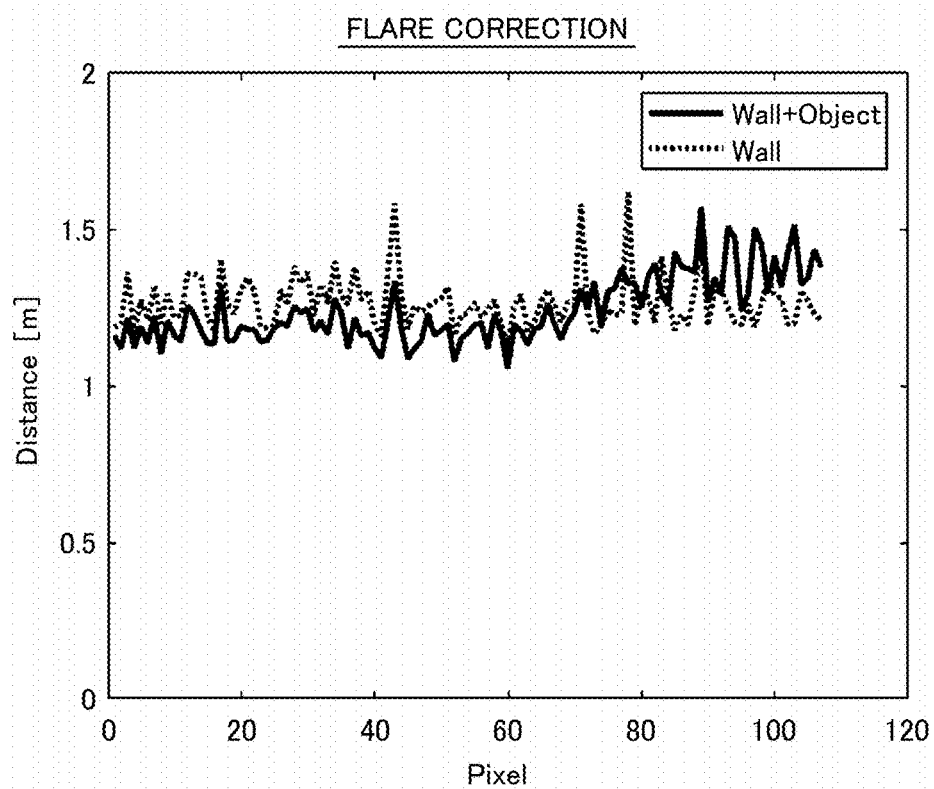
FIG. 9F is a diagram showing an effect of the intermediate distance mode according to the first embodiment.

In FIGS. 9E and 9F, relations between pixels of vertical cross-sections (D2) of FIGS. 9A and 9B and distances are shown. FIG. 9E illustrates a result acquired using a distance image before elimination of a flare light component (no correction), and FIG. 9F illustrates a result acquired using a distance image after elimination of the flare light component (flare correction). In FIGS. 9E and 9F, the horizontal axis represents a pixel (Pixel), and the vertical axis represents a distance (Distance [m])).

As shown in FIG. 9E, in a case in which correction is not performed, a difference of 30 cm to 40 cm occurs between a case in which the short distance object A is absent (a dotted line) and a case in which the short distance object A is present (a solid line), and particularly, the difference becomes larger in accordance with approach to the position of the short distance object A (near 60 Pixel). On the other hand, as shown in FIG. 9F, in a case in which flare correction is performed, a case in which the short distance object A is absent (a dotted line) and a case in which the short distance object is present (a solid line) almost overlap each other, and the difference does not increase also in an area close to the short distance object A.

Here, the flow of the process performed by the distance-image capturing apparatus 1 according to the first embodiment will be described with reference to FIG. 10.

Step S100:

The distance-image capturing apparatus 1, first, performs measurement in the normal mode 1. The distance-image capturing apparatus 1 stores measurement results (a distance DB to an object B that is a subject, the amount of electric charge accumulated in the electric charge accumulating unit CS, and the like).

Step S101:

The distance-image capturing apparatus 1 determines whether a flare light component is present in the amount of electric charge Q2 accumulated in the electric charge accumulating unit CS2 from the measurement result using the normal mode 1. In a case in which the amount of electric charge Q2 (for example, an average value of the amounts of electric charge Q2 in all the pixels) is equal to or larger than a predetermined threshold set in advance, the distance-image capturing apparatus 1 determines that a flare light component is present in the amount of electric charge Q2. In a case in which it is determined that a flare light component is present in the amount of electric charge Q2, the distance-image capturing apparatus 1 performs the process of Step S102. On the other hand, in a case in which it is determined that a flare light component is absent in the amount of electric charge Q2, the distance-image capturing apparatus 1 returns to Step S100 and continues measurement using the normal mode 1.

Step S102:

The distance-image capturing apparatus 1 performs measurement using the normal mode 2. In the normal mode 2, the number of times of distribution is smaller than in the normal mode 1, and the amount of exposure is suppressed, and thus the distance to a long distance subject is not measured (cannot be measured), and only the distance to the short distance object A is measured. The distance-image capturing apparatus 1 stores measurement results (a distance DA to the short distance object A and the like).

Step S103:

The distance-image capturing apparatus 1 determines whether re-measurement for eliminating the flare light component is performed in the long-distance mode or in the intermediate distance mode. In a case in which a difference (an absolute value) between the distance DA and the distance DB is equal to or larger than a predetermined threshold, the distance-image capturing apparatus 1 performs re-measurement in the long-distance mode. On the other hand, in a case in which a difference (an absolute value) between the distance DA and the distance DB is smaller than the predetermined threshold, the distance-image capturing apparatus 1 performs re-measurement in the intermediate distance mode. In a case in which the re-measurement is performed in the long-distance mode, the distance-image capturing apparatus 1 performs a process shown in Step S104. In a case in which the re-measurement is performed in the intermediate distance mode, the distance-image capturing apparatus 1 performs a process shown in Step S106.

Step S104:

The distance-image capturing apparatus 1 performs measurement in the long-distance mode. The measurement in the long-distance mode, for example, is performed for the same number of times of distribution as the number of times of distribution of the normal mode 1.

Step S105:

After repeating the long-distance mode for a predetermined number of frames (for example, 30 frames), the distance-image capturing apparatus 1 determines whether or not the short distance object A is continuously present. This is a process of returning to the normal mode 1 from the long-distance mode in a case in which a relation between the short distance object A and the subject changes as in a case in which the short distance object A is a mobile body or the like. The distance-image capturing apparatus 1 determines whether or not a flare light component is present in the amount of electric charge Q2 accumulated in the electric charge accumulating unit CS2 from the measurement results of the normal mode 1. For the determination of whether or not a flare light component is present, a method similar to that of the process shown in Step S101 may be used. In a case in which it is determined that a flare light component is present in the amount of electric charge Q2, the distance-image capturing apparatus 1 returns to the process of Step S104 and continues measurement using the long-distance mode. On the other hand, in a case in which it is determined that a flare light component is absent in the amount of electric charge Q2, the distance-image capturing apparatus 1 returns to the Step S100 and returns to the measurement using the normal mode 1.

Step S106:

The distance-image capturing apparatus 1 performs measurement in the intermediate distance mode. The measurement in the intermediate distance mode, for example, is performed for the same number of times of distribution as the number of times of distribution of the normal mode 1. The distance-image capturing apparatus 1 stores the amounts of electric charge accumulated in the electric charge accumulating units CS1 to CS3 and performs the process represented in Step S107.

Step S107:

The distance-image capturing apparatus 1 determines whether or not a flare light component is present in the amount of electric charge Q2 accumulated in the electric charge accumulating unit CS2 from the measurement results of the intermediate distance mode. This is a process corresponding to a case in which a flare light component disappears when re-measurement is performed in the intermediate distance mode such as a case in which the short distance object A is a mobile body and temporarily traverses the measurement area or the like even in a case in which it is determined that a flare light component is present in Step S101. A method for determining whether or not a flare light component is present in the amount of electric charge Q2 is similar to Step S101. In a case in which it is determined that a flare light component is present in the amount of electric charge Q2, the distance-image capturing apparatus 1 performs a process of Step S107. On the other hand, in a case in which it is determined that a flare light component is absent in the amount of electric charge Q2, the distance-image capturing apparatus 1 performs a process of Step S108.

Step S108:

The distance-image capturing apparatus 1 eliminates the flare light component included in the amount of electric charge Q2 using the measurement results of the intermediate distance mode (the amounts of electric charge accumulated in the electric charge accumulating units CS1 to CS3) and calculates the distance to the object B. Although description is omitted in this flowchart, the distance-image capturing apparatus 1 calculates the distance to the object B using an external light component measured in the intermediate distance external light mode for the measurement results of the intermediate distance mode. The distance-image capturing apparatus 1 returns to the process of Step S106 and continues measurement using the intermediate distance mode.

Step S109:

The distance-image capturing apparatus 1 calculates the distance to the object B without eliminating a flare light component of the amount of electric charge Q2 of flare light using measurement results of the intermediate distance mode (the amounts of electric charge accumulated in the electric charge accumulating units CS1 to CS3). The method for calculating a distance in this case is similar to a conventional calculation method. The distance-image capturing apparatus 1 returns to Step S100 and returns to the measurement using the normal mode 1.

In the flowchart described above, measurement of once in each measurement mode may be a measurement result corresponding to one frame, or measurement results corresponding to a plurality of frames may be averaged (for example, a moving average).

As described above, the distance-image capturing apparatus 1 according to the first embodiment includes the light source unit 2, the light receiving unit 3, and the distance image processing unit 4. The light source unit 2 emits a light pulse PO into a measurement space E. The light receiving unit 3 includes pixels each including a photoelectric conversion device PD that generates electric charge corresponding to incident light and a plurality of electric charge accumulating units CS accumulating the electric charge and the vertical scanning circuit 323 (a pixel driving circuit) that distributes and accumulates electric charge at a predetermined accumulation timing synchronized with the emission of the light pulse PO into each of the electric charge accumulating units CS. The distance image processing unit 4 measures the distance to a subject S present in a measurement space E on the basis of amounts of electric charge accumulated in each of the electric charge accumulating units CS. The distance image processing unit 4 includes a timing control unit 41. The timing control unit 41 controls an accumulation timing in accordance with a measurement mode set in advance in accordance with the range of distances that are measurement targets. In accordance with this, the distance-image capturing apparatus 1 according to the first embodiment can select a measurement mode in accordance with the range of distances that are measurement targets. For this reason, in a case in which there is an influence of flare light at the time of measuring an object present at a long distance, the influence of the flare light can be reduced by changing the accumulation timing. Thus, the influence of a flare phenomenon can be inhibited without changing the optical configuration inside the apparatus and without using a database.

In addition, in the distance-image capturing apparatus 1 according to the first embodiment, the timing control unit 41 adjusts the accumulation timing such that flare light is not received, and electric charge corresponding to the amount of the flare light is not accumulated in a case in which the measurement mode is the long-distance mode. In accordance with this, a flare light component can be excluded, and effects similar to the effects described above are acquired.

In addition, in the distance-image capturing apparatus 1 according to the first embodiment, in a case in which the measurement mode is the intermediate distance mode, the timing control unit 41 adjusts the accumulation timing such that electric charge corresponding to flare light is distributed and accumulated into the electric charge accumulating units CS1 and CS2. In accordance with this, the flare light component can be eliminated, and effects similar to the effects described above are acquired.

In addition, in the distance-image capturing apparatus 1 according to the first embodiment, in a case in which the measurement mode is the intermediate distance mode, the timing control unit 41 eliminates an external light component using an amount of electric charge corresponding to the external light that is separately measured. In accordance with this, elimination of the flare light component and elimination of the external light component can be performed, and effects similar to the effects described above are acquired.

In addition, in the distance-image capturing apparatus 1 according to the first embodiment, in a case in which the measurement mode is the intermediate distance mode, the timing control unit 41 adjusts the accumulation timing such that electric charge corresponding to external light in the intermediate distance external light mode is accumulated in the electric charge accumulating unit CS. In accordance with this, by performing co-called frame composition, elimination of the flare light component and elimination of the external light component can be easily performed, and effects similar to the effects described above are acquired.

In addition, in the distance-image capturing apparatus 1 according to the first embodiment, in a case in which the measurement mode is the intermediate distance mode, the distance calculating unit 42 sets a value acquired by multiplying the amount of electric charge accumulated in the electric charge accumulating unit CS1 by the constant K as a flare light component included in the amount of electric charge accumulated in the electric charge accumulating unit CS2. In accordance with this, the flare light component can be eliminated, and effects similar to the effects described above are acquired.

Figure 10:
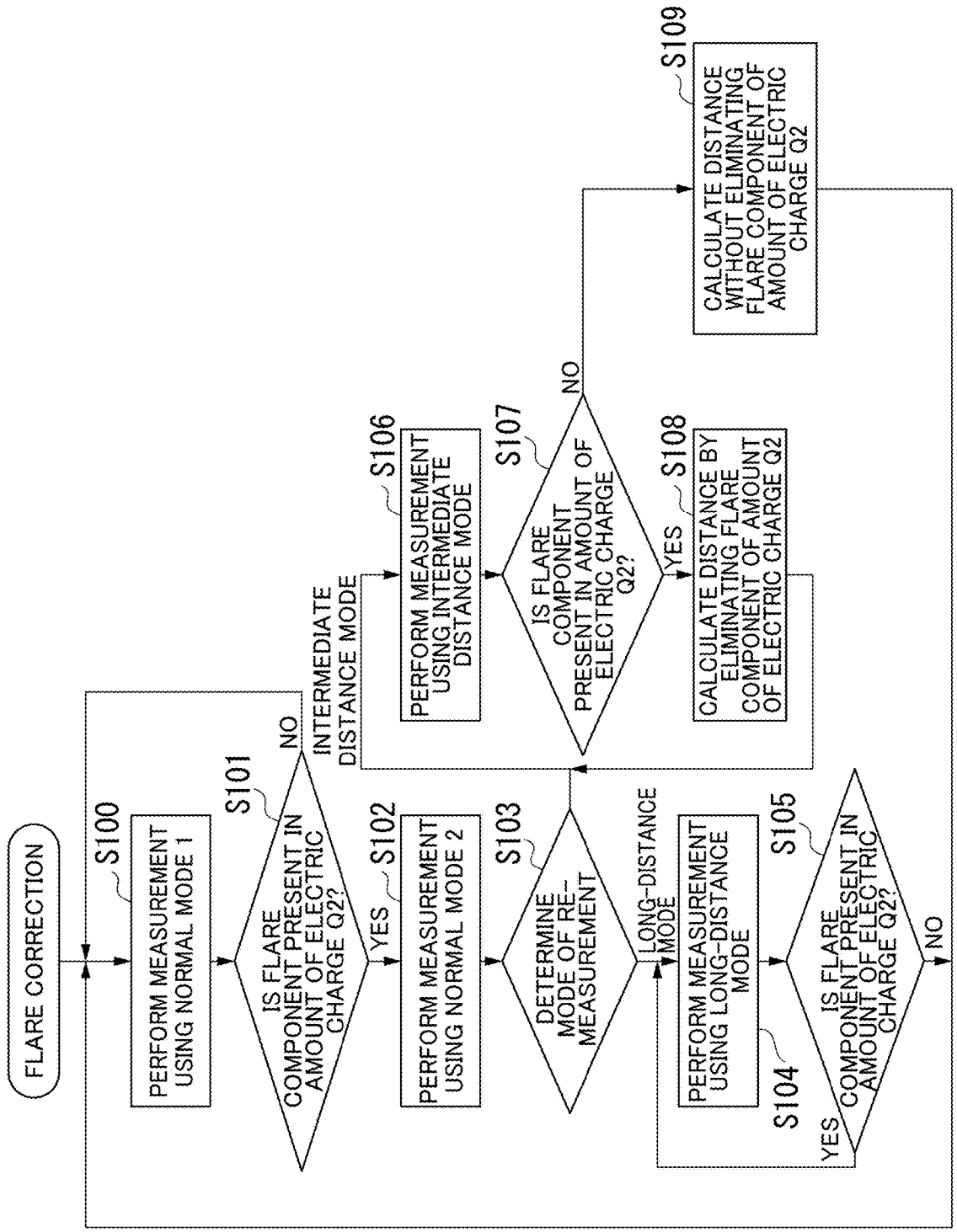
FIG. 10 is a flowchart showing the flow of a process of the distance-image capturing apparatus 1 according to the first embodiment.

In addition, in the distance-image capturing apparatus 1 according to the first embodiment, for example, as shown in the flow shown in FIG. 10, measurement is performed while dynamically changing the measurement mode in accordance with a result of determination of presence/absence of flare light. In accordance with this, even in a case in which a short distance object temporarily traverses the measurement space E, re-measurement can be performed by performing switching between measurement modes, and effects similar to the effects described above are acquired.

Second Embodiment

Next, a second embodiment will be described. In this embodiment, a pixel includes four electric charge accumulating units CS1 to CS4, which is different from the embodiment described above.

Figure 11:
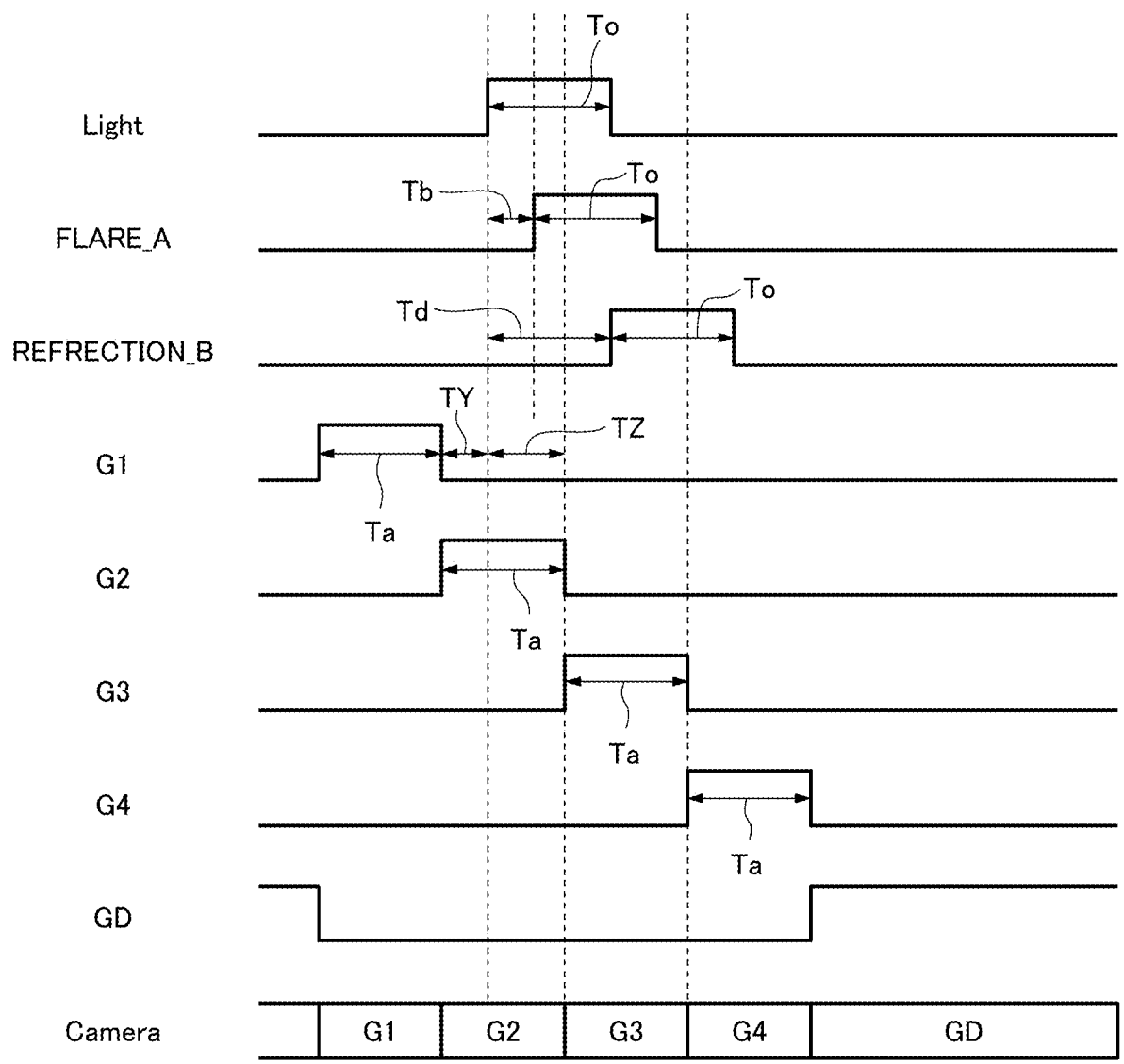
FIG. 11 is a timing diagram showing timings at which pixels are driven in a distance-image capturing apparatus 1 according to a second embodiment.

FIG. 11 is a timing diagram showing timings at which pixels 321 are driven in the second embodiment. Items such as "Light" and the like in FIG. 11 are similar to those shown in FIG. 12C, and thus a description thereof will be omitted. In addition, emission of a light pulse PO, timing relations of reception of flare light and reception of reflected light RL in FIG. 11 are similar to those shown in FIG. 5A, and thus a description thereof will be omitted.

As shown in FIG. 11, in this embodiment, by sequentially causing the electric charge accumulating units CS1 to CS4 to be the on state, operations corresponding to an intermediate distance mode and an intermediate distance external light mode are simultaneously performed. In accordance with this, an amount of electric charge corresponding to one frame corresponding to the amount of external light is accumulated in the electric charge accumulating unit CS1. In the electric charge accumulating units CS2 and CS3, the amount of electric charge corresponding to one frame that corresponds to an amount of flare light is accumulated in accordance with a distribution ratio. In the electric charge accumulating units CS3 and CS4, the amount of electric charge corresponding to one frame that corresponds to the amount of reflected light RL is accumulated in accordance with the distribution ratio.

A distance calculating unit 42 determines a constant K on the basis of the amount of electric charge accumulated in the electric charge accumulating unit CS2 and the distance to a short distance object A. The distance calculating unit 42 extracts a flare light component in the amount of electric charge accumulated in the electric charge accumulating unit CS3 using the constant K. By eliminating the extracted flare light component from the electric charge accumulating unit CS3, the distance calculating unit 42 calculates an amount of electric charge corresponding to reflected light RL accumulated in the electric charge accumulating unit CS3. The distance calculating unit 42 calculates the distance to an object using the amount of electric charge corresponding to the reflected light RL accumulated in the electric charge accumulating unit CS3 and the amounts of electric charge accumulated in the electric charge accumulating units CS1 and CS4.

As described above, in the distance-image capturing apparatus 1 according to the second embodiment, the pixel 321 includes four electric charge accumulating units CS. In accordance with this, measurement using the intermediate distance mode and measurement using the intermediate distance external light mode can be simultaneously performed, and a distance can be calculated with high accuracy without performing complicated processes such as so-called frame composition and the like.

All or a part of the distance-image capturing apparatus 1 according to the embodiment described above may be configured to be realized by a computer. In such a case, by recording a program used for realizing the function on a computer-readable recording medium and causing the computer system to read and execute the program recorded on this recording medium, the function may be realized. The "computer system" described here is a system that includes an OS and hardware such as peripherals. The "computer-readable recording medium" represents a portable medium such as a flexible disk, a magneto-optical disc, a ROM, or a CD-ROM or a storage device such as a hard disk built into a computer system. Furthermore, the "computer-readable recording medium" may include a medium dynamically storing the program for a short time such as a communication line of a case in which the program is transmitted through a network such as the Internet or a communication circuit line such as a telephone line and a medium storing the program for a predetermined time such as an internal volatile memory of the computer system that becomes a server or a client in such a case. The program described above may be a program used for realizing a part of the function described above or a program that can realize the function described above in combination with a program that is already recorded in the computer system and may be realized using a programmable logic device such as an FPGA.

As above, although the embodiments of the present invention have been described in detail with reference to the drawings, the specific configuration is not limited to such embodiments, and designs and the like in a range not departing from the concept of the present invention are included therein.

According to the present invention, an effect according to a flare phenomenon can be inhibited without changing the optical configuration inside the apparatus and without using a database.

What is claimed is:

1. A distance-image capturing apparatus comprising:
a light source unit that emits a light pulse to a measurement space that is a space in which measurement is performed;
a light receiving unit that includes pixels with each pixel of the pixels including a photoelectric conversion device generating electric charge according to incident light and a plurality of electric charge accumulating units accumulating the electric charge of each pixel of the pixels and a pixel driving circuit that distributes the electric charge to the plurality of electric charge accumulating units of the pixels to be accumulated in the plurality of electric charge accumulating units at an accumulation timing synchronized with an emission of the light pulse; and
a distance image processing unit that measures a distance to a subject present in the measurement space on basis of amounts of electric charge accumulated in the plurality of electric charge accumulating units,
wherein the distance image processing unit includes a timing control unit that controls the accumulation timing in accordance with a measurement mode set in advance in accordance with a range of distances that are measurement targets,
wherein the plurality of electric charge accumulating units of each pixel of the pixels are formed from a first electric charge accumulating unit, a second electric charge accumulating unit, and a third electric charge accumulating unit,
wherein, in a case in which the measurement mode is a long-distance mode, the timing control unit accumulates the electric charge in the first electric charge accumulating unit in an external light accumulation period that is an off state in which the light pulse is not emitted, sets at least a flare light reception period as a non-accumulation period in which the electric charge is not accumulated in any one of the plurality of electric charge accumulating units, and, after elapse of the non-accumulation period, distributes an electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit,
wherein the flare light reception period is a period that is delayed by a pulse light delay time from an emission period that is a period in which the light pulse is emitted,
wherein the reflected light reception period is a period delayed by a reflected light delay time longer than the pulse light delay time from the emission period, and
wherein the flare light reception period and the reflected light reception period are periods not overlapping each other in the long-distance mode.

2. A distance-image capturing apparatus comprising:
a light source unit that emits a light pulse to a measurement space that is a space in which measurement is performed;
a light receiving unit that includes pixels with each pixel of the pixels including a photoelectric conversion device generating electric charge according to incident light and a plurality of electric charge accumulating units accumulating the electric charge and a pixel driving circuit that distributes the electric charge to the plurality of electric charge accumulating units of each pixel of the pixels to be accumulated in the plurality of electric charge accumulating units at an accumulation timing synchronized with an emission of the light pulse; and
a distance image processing unit that measures a distance to a subject present in the measurement space on basis of amounts of electric charge accumulated in the plurality of electric charge accumulating units,
wherein the distance image processing unit includes a timing control unit that controls the accumulation timing in accordance with a measurement mode set in advance in accordance with a range of distances that are measurement targets,
wherein the plurality of electric charge accumulating units of each pixel of the pixels are formed from a first electric charge accumulating unit, a second electric charge accumulating unit, and a third electric charge accumulating unit,
wherein, in a case in which the measurement mode is an intermediate distance mode, the timing control unit distributes an electric charge corresponding to an amount of light incident to the light receiving unit in a flare light reception period to the first electric charge accumulating unit and the second electric charge accumulating unit to be accumulated in the first electric charge accumulating unit and the second electric charge accumulating unit and distributes an electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit, wherein the flare light reception period is a period that is delayed by a pulse light delay time from an emission period that is a period in which the light pulse is emitted, wherein the reflected light reception period is a period delayed by a reflected light delay time longer than the pulse light delay time from the emission period, wherein the flare light reception period and the reflected light reception period are periods at least partially overlapping each other in the intermediate distance mode, and wherein the distance image processing unit extracts a flare light component according to flare light from the amounts of electric charges on the basis of the amounts of electric charge accumulated in the plurality of electric charge accumulating units in the intermediate distance mode and measures the distance to the subject on basis of values acquired by excluding the flare light component extracted from the amounts of electric charge.

3. The distance-image capturing apparatus according to claim 2, wherein the timing control unit performs a measurement in the intermediate distance mode and a measurement in an intermediate distance external light mode, as a respective measurement mode, and, in a case in which the respective measurement mode is the intermediate distance external light mode, accumulates the electric charge in the first electric charge accumulating unit in an external light accumulation period that is an off state in which the light pulse is not emitted, and wherein the distance image processing unit extracts a flare light component according to flare light on the basis of the amounts of electric charge accumulated in the plurality of electric charge accumulating units in the intermediate distance mode, extracts an external light component according to external light on the basis of the amounts of electric charge accumulated in the plurality of electric charge accumulating units in the intermediate distance external light mode, and measures the distance to the subject using the flare light component extracted and the external light component.

4. The distance-image capturing apparatus according to claim 3, wherein, in a case in which the measurement mode is the intermediate distance external light mode, the timing control unit accumulates the electric charge in the first electric charge accumulating unit in the external light accumulation period in which the light pulse is the off state, sets the flare light reception period as a non-accumulation period in which the electric charge is not accumulated in any one of the plurality of electric charge accumulating units, and distributes an electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit, and wherein the distance image processing unit measures the distance to the subject present in the measurement space by combining the amounts of electric charge accumulated in the plurality of electric charge accumulating units in the intermediate distance mode and the amounts of electric charge accumulated in the plurality of electric charge accumulating units in the intermediate distance external light mode.

5. The distance-image capturing apparatus according to claim 2, wherein the distance image processing unit extracts values acquired by multiplying the amount of electric charge accumulated in the first electric charge accumulating unit by a constant in the intermediate distance mode as a flare light component according to flare light included in the amount of electric charge accumulated in the second electric charge accumulating unit.

6. A distance-image capturing apparatus comprising:

a light source unit that emits a light pulse to a measurement space that is a space in which measurement is performed;

a light receiving unit that includes pixels with each pixel of the pixels including a photoelectric conversion device generating electric charge according to incident light and a plurality of electric charge accumulating units accumulating the electric charge and a pixel driving circuit that distributes the electric charge to the plurality of electric charge accumulating units of the pixels to be accumulated in the plurality of electric charge accumulating units at an accumulation timing synchronized with an emission of the light pulse;

a distance image processing unit that measures a distance to a subject present in the measurement space on basis of amounts of electric charge accumulated in the plurality of electric charge accumulating units; and a measurement control unit that controls measurement, wherein the distance image processing unit includes a timing control unit that controls the accumulation timing in accordance with a measurement mode set in advance in accordance with a range of distances that are measurement targets, wherein the measurement control unit causes the distance to the subject to be measured with the measurement mode set as a first normal mode, determines whether or not a short distance object present at a shorter distance than the subject is present in the measurement space on the basis of the amounts of electric charge accumulated in the plurality of electric charge accumulating units in the first normal mode, and, in a case in which the short distance object is present in the measurement space, changes the measurement mode and performs re-measurement, and wherein the plurality of electric charge accumulating units of each pixel of the pixels are formed from a first electric charge accumulating unit, a second electric charge accumulating unit, and a third electric charge accumulating unit, and wherein, in a case in which the measurement mode is the first normal mode, the timing control unit accumulates the electric charge in the first electric charge accumulating unit in an external light accumulation period that is an off state in which the light pulse is not emitted and repeats an accumulation period in which the electric charge is sequentially accumulated in the second electric charge accumulating unit and the third electric charge accumulating unit for a number of accumulation times in a reflected light reception period after an on state in which the light pulse is emitted is formed.

7. The distance-image capturing apparatus according to claim 6, wherein, in a case in which an amount of electric charge accumulated in the second electric charge accumulating unit is equal to or larger than a threshold in the first normal mode, the measurement control unit determines that the short distance object is present in the measurement space.

8. A distance-image capturing method using a distance-image capturing apparatus comprising:
- a light source unit that emits a light pulse to a measurement space that is a space in which measurement is performed;
- a light receiving unit that includes pixels with each pixel of the pixels including a photoelectric conversion device generating electric charge according to incident light and a plurality of electric charge accumulating units accumulating the electric charge and a pixel driving circuit that distributes the electric charge to the plurality of electric charge accumulating units of the pixels to be accumulated in the plurality of electric charge accumulating units at an accumulation timing synchronized with an emission of the light pulse;
- a distance image processing unit that measures a distance to a subject present in the measurement space on basis of amounts of electric charge accumulated in the plurality of electric charge accumulating units; and
- a timing control unit that controls the accumulation timing, the distance-image capturing method comprising:
- controlling the accumulation timing in accordance with a measurement mode set in advance in accordance with a range of distances that are measurement targets using the timing control unit,
- wherein the plurality of electric charge accumulating units of each pixel of the pixels are formed from a first electric charge accumulating unit, a second electric charge accumulating unit, and a third electric charge accumulating unit,
- wherein, in a case in which the measurement mode is a long-distance mode, the timing control unit accumulates the electric charge in the first electric charge accumulating unit in an external light accumulation period that is an off state in which the light pulse is not emitted, sets at least a flare light reception period as a non-accumulation period in which the electric charge is not accumulated in any one of the plurality of electric charge accumulating units, and, after elapse of the non-accumulation period, distributes an electric charge corresponding to an amount of light incident to the light receiving unit in a reflected light reception period to the second electric charge accumulating unit and the third electric charge accumulating unit to be accumulated in the second electric charge accumulating unit and the third electric charge accumulating unit,
- wherein the flare light reception period is a period that is delayed by a pulse light delay time from an emission period that is a period in which the light pulse is emitted,
- wherein the reflected light reception period is a period delayed by a reflected light delay time longer than the pulse light delay time from the emission period, and
- wherein the flare light reception period and the reflected light reception period are periods not overlapping each other in the long-distance mode.

* * * * *